United States Patent
Kim et al.

(10) Patent No.: US 10,848,223 B2
(45) Date of Patent: Nov. 24, 2020

(54) METHOD FOR REPORTING CHANNEL STATE AND APPARATUS THEREFOR

(71) Applicant: LG ELECTRONICS INC., Seoul (KR)

(72) Inventors: Kijun Kim, Seoul (KR); Jonghyun Park, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 13 days.

(21) Appl. No.: 15/756,480

(22) PCT Filed: Aug. 8, 2016

(86) PCT No.: PCT/KR2016/008694
§ 371 (c)(1),
(2) Date: Feb. 28, 2018

(87) PCT Pub. No.: WO2017/039166
PCT Pub. Date: Mar. 9, 2017

(65) Prior Publication Data
US 2018/0262250 A1    Sep. 13, 2018

Related U.S. Application Data

(60) Provisional application No. 62/212,644, filed on Sep. 1, 2015, provisional application No. 62/216,981, filed on Sep. 10, 2015.

(51) Int. Cl.
*H04B 7/06* (2006.01)
*H04W 52/36* (2009.01)
(Continued)

(52) U.S. Cl.
CPC ......... *H04B 7/0626* (2013.01); *H04B 7/0486* (2013.01); *H04B 7/063* (2013.01);
(Continued)

(58) Field of Classification Search
None
See application file for complete search history.

(56) References Cited

U.S. PATENT DOCUMENTS

2008/0080516 A1*  4/2008  Sammour .............. H04L 1/165
                                                    370/394
2009/0080365 A1*  3/2009  Song ..................... H04L 12/189
                                                    370/312
(Continued)

FOREIGN PATENT DOCUMENTS

KR    1020150030197 A    3/2015
WO    2015093910 A1      6/2015

OTHER PUBLICATIONS

LG Electronics, "Beamformed CSI-RS related enhancements based on the identified approaches," 3GPP TSG RAN WG1 Meeting #82, Aug. 24-28, 2015, R1-154274.

*Primary Examiner* — Andrew C Oh
(74) *Attorney, Agent, or Firm* — Dentons US LLP

(57) ABSTRACT

The present specification relates to a wireless communication system and, more particularly, to a method for reporting a channel state and an apparatus therefor. When a plurality of channel state information-reference signal (CSI-RS) resources are set for a channel state information (CSI) process, a terminal of the present invention generates channel state information indicating a CSI-RS resource indicator (CRI) indicating one of the plurality of CSI-RS resources and a rank indicator (RI) which is based on the CRI. The terminal reports the channel state information. Accordingly, the present invention is capable of more efficient channel state reporting by transmitting a CRI indicating a CSI-RS resource, selected from among a plurality of CSI-RS resources set for the CSI process, together with the RI for the selected CSI-RS resource.

12 Claims, 16 Drawing Sheets

(a)

(b)

(51) Int. Cl.
  *H04B 17/10*  (2015.01)
  *H04B 17/309*  (2015.01)
  *H04B 17/373*  (2015.01)
  *H04B 7/0456*  (2017.01)

(52) U.S. Cl.
  CPC ......... *H04B 17/102* (2015.01); *H04B 17/309* (2015.01); *H04B 17/373* (2015.01); *H04W 52/367* (2013.01)

(56) References Cited

U.S. PATENT DOCUMENTS

| | | | |
|---|---|---|---|
| 2012/0127869 A1* | 5/2012 | Yin | H04L 5/001 370/252 |
| 2013/0156001 A1* | 6/2013 | Gomadam | H04B 7/0626 370/330 |
| 2013/0258986 A1* | 10/2013 | Seo | H04L 5/001 370/329 |
| 2013/0301448 A1* | 11/2013 | Sayana | H04W 24/10 370/252 |
| 2013/0322376 A1 | 12/2013 | Marinier et al. | |
| 2013/0336214 A1* | 12/2013 | Sayana | H04B 7/063 370/328 |
| 2014/0003240 A1* | 1/2014 | Chen | H04W 28/08 370/235 |
| 2014/0010126 A1* | 1/2014 | Sayana | H04B 7/0626 370/280 |
| 2014/0079100 A1* | 3/2014 | Kim | H04B 7/0417 375/219 |
| 2014/0086111 A1* | 3/2014 | Li | H04L 5/0082 370/280 |
| 2015/0155999 A1 | 6/2015 | Gao et al. | |
| 2015/0195071 A1* | 7/2015 | Lunttila | H04L 5/0053 370/329 |
| 2015/0236801 A1* | 8/2015 | Sun | H04L 27/2613 370/328 |
| 2015/0281958 A1* | 10/2015 | Simplicio Junior | H04W 12/04 713/155 |
| 2015/0351092 A1* | 12/2015 | Seo | H04L 5/0048 370/329 |
| 2015/0373694 A1* | 12/2015 | You | H04L 5/0094 370/329 |
| 2016/0094284 A1* | 3/2016 | Yum | H04B 7/063 375/267 |
| 2016/0337874 A1* | 11/2016 | Yang | H04B 7/0478 |
| 2016/0344524 A1* | 11/2016 | Kim | H04L 5/0048 |
| 2017/0078062 A1* | 3/2017 | Park | H04J 11/00 |
| 2017/0086087 A1* | 3/2017 | Kim | H04W 24/10 |
| 2017/0366243 A1* | 12/2017 | Xiao | H04L 1/0026 |

\* cited by examiner

FIG. 6

Antenna element  Antenna port

METHOD FOR REPORTING CHANNEL STATE AND APPARATUS THEREFOR

This application is a National Stage Application of International Application No. PCT/KR2016/008694, filed on Aug. 8, 2016, which claims the benefit of U.S. Provisional Application No. 62/212,644, filed on Sep. 1, 2015 and U.S. Provisional Application No. 62/216,981, filed on Sep. 10, 2015, all of which are hereby incorporated by reference in their entirety for all purposes as if fully set forth herein.

TECHNICAL FIELD

The present invention relates to a wireless communication system, and more particularly, to a method for reporting a channel state and an apparatus therefor.

BACKGROUND ART

Various techniques including Machine-to-Machine (M2M) communication and various devices requiring a high data rate, e.g., smart phones and tablet Personal Computers (PCs), have emerged and gained popularity. As a consequence, the amount of data to be processed in a cellular network is rapidly increasing. To satisfy the rapidly increasing data processing requirement, Carrier Aggregation (CA), cognitive radio, etc. for efficiently using a larger number of frequency bands, and Multiple Input Multiple Output (MIMO), Coordinated Multipoint transmission and reception (CoMP), etc. for increasing the amount of data transmitted in limited frequencies have been developed. Furthermore, communication environments are evolving toward an increased density of nodes accessible by User Equipments (UEs). A node refers to a fixed point having one or more antennas and capable of transmitting or receiving radio signals to or from UEs. A communication system with densely populated nodes can provide high-performance communication services to UEs through cooperation between nodes.

This multi-node cooperative communication scheme in which a plurality of nodes communicate with a UE using the same time-frequency resources offers a higher throughput than in a conventional communication scheme in which each node operates as an independent Base Station (BS) and communicates with a UE without cooperation from other nodes.

A multi-node system performs cooperative communication by using a plurality of nodes, each of which is operating as a BS, an Access Point (AP), an antenna, an antenna group, a Radio Remote Header (RRH) or a Radio Remote Unit (RRU). Compared to a conventional centralized antenna system in which antennas are concentrated in a BS, the plurality of nodes are normally spaced apart from each other by a predetermined distance or more in the multi-node system. The plurality of nodes may be managed by one or more BSs or one or more BS Controllers (BSCs) that control operation of each node or schedule data to be transmitted or received through each node. Each node is connected to a BS or BSC that controls the node through a cable or a dedicated line.

The above-described multi-node system may be regarded as an MIMO system in the sense that distributed nodes can communicate with a single UE or multiple UEs by transmitting or receiving different streams at the same time. However, since signals are transmitted using nodes distributed to various locations, each antenna covers a reduced transmission area in the multi-node system, relative to antennas in the conventional centralized antenna system. As a result, each antenna may need a reduced Tx power in transmitting a signal in the multi-node system, compared to a conventional system that implements MIMO with a centralized antenna system. In addition, as the transmission distance between an antenna and a UE is reduced, path loss is decreased and high-rate data transmission is possible. Accordingly, the transmission capacity and power efficiency of a cellular system may be increased and communication may satisfactorily be performed with uniform quality irrespective of the locations of UEs within a cell. Furthermore, the multi-node system boasts of reduced signal loss during transmission because a BS(s) or BSC(s) connected to a plurality of nodes cooperate in data transmission and reception. Also, if nodes located apart from each other by a predetermined distance or more perform cooperative communication with a UE, correlation and interference between antennas are decreased. Consequently, the multi-node cooperative communication scheme achieves a high Signal-to-Interference plus Noise Ratio (SINR).

Owing to these advantages of the multi-node system, the multi-node system has emerged as a promising basis for cellular communication by substituting for the conventional centralized antenna system or operating in conjunction with the conventional centralized antenna system in order to reduce BS deployment cost and backhaul maintenance cost, extend service coverage, and increase channel capacity and SINR.

DISCLOSURE

Technical Problem

The present invention suggests a method for reporting a channel state, and suggests a method for configuring one or more CSI-RS (channel state information-reference signal) resources in a CSI (channel state information) process by means of a base station and reporting a channel state for one of the CSI-RS resources from a user equipment.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

In one aspect of the present invention, a method for reporting a channel state of a user equipment (UE) in a wireless communication system comprises the steps of generating channel state information including a channel state information-reference signal (CSI-RS) resource indicator (CRI) indicating one of a plurality of CSI-RS resources and a rank indicator (RI) based on the CRI if the plurality of CSI-RS resources are configured for a channel state information (CSI) process; and reporting the channel state information.

In another aspect of the present invention, a method for receiving a channel state of a base station in a wireless communication system comprises the steps of configuring a plurality of channel state information-reference signal (CSI-RS) resources for a first channel state information (CSI) process; and receiving channel state information including a CSI-RS resource indicator (CRI) indicating one of the plurality of CSI-RS resources and a rank indicator (RI) based on the CRI.

In still another aspect of the present invention, a UE in a wireless communication system comprises a radio frequency (RF) unit; and a processor configured to control the RF unit, wherein the processor is configured to generate channel state information including a channel state information-reference signal (CSI-RS) resource indicator (CRI) indicating one of a plurality of CSI-RS resources and a rank indicator (RI) based on the CRI if the plurality of CSI-RS resources are configured for a channel sate information (CSI) process and report the channel state information by controlling the RF unit.

In further still another aspect of the present invention, a base station in a wireless communication system comprises a radio frequency (RF) unit; and a processor configured to control the RF unit, wherein the processor is configured to configure a plurality of channel state information-reference signal (CSI-RS) resources for a first channel state information (CSI) process and receive channel state information including a CSI-RS resource indicator (CRI) indicating one of the plurality of CSI-RS resources and a rank indicator (RI) based on the CRI by controlling the RF unit.

In each aspect of the present invention, the CRI and the RI may be concatenated and then included in the channel state information.

Particularly, the CRI may be arranged prior to the RI and then concatenated with the RI.

In each aspect of the present invention, the UE may generate channel state information including RI for a single CSI-RS resource without CRI indicating the single CSI-RS resource if the single CSI-RS resource is configured for the CSI process, and the base station may receive, from the UE, channel state information including RI for the single CSI-RS resource without CRI indicating the single CSI-RS resource.

At this time, the channel state information including the CRI and RI based on the CRI or channel state information including RI for the single CSI-RS resource without CRI indicating the single CSI-RS resource may be transmitted through resource elements obtained as much as the number based on the following Equation:

$$Q' = \min\left(\left\lceil \frac{O \times M_{sc}^{PUSCH-initial} \times N_{symb}^{PUSCH-initial} \times \beta_{offset}}{\sum_{r=0}^{C-1} K_r} \right\rceil, 4 \times M_{sc}^{PUSCH}\right),$$ [Equation]

where O may indicate a total number of bits including the CRI and RI based on the CRI, which will be transmitted, or a total number of bits of RI for the single CSI-RS resource, $M_{sc}^{PUSCH}$ may indicate the number of subcarriers allocated for PUSCH (physical uplink shared channel) transmission, $M_{sc}^{PUSCH-initial}$ may indicate the number of subcarriers allocated at a subframe of an initial PUSCH transmission timing, $N_{symb}^{PUSCH-initial}$ may indicate the number of SC-FDMA (single carrier—frequency division multiple access) symbols used for PUSCH transmission at the subframe of the initial PUSCH transmission timing, C and $K_r$ may indicate the number of coding blocks of data which will be transmitted through the PUSCH and a length of data bits per code blocks, and $\beta_{offset}$ may indicate an offset value or corrected value.

In each aspect of the present invention, the channel state information may include a plurality of CRI+RI pairs comprised of CRI corresponding to each of a plurality of CSI processes and RI based on the CRI if a channel state for the plurality of CSI processes is reported, and the plurality of CRI+RI pairs may be combined in the order based on index information of the plurality of CSI processes or index information of a plurality of carriers associated with the plurality of CSI processes.

The above technical solutions are merely some parts of the embodiments of the present invention and various embodiments into which the technical features of the present invention are incorporated can be derived and understood by persons skilled in the art from the following detailed description of the present invention.

Advantageous Effects

In one embodiment of the present invention, CRI indicating one of a plurality of CSI-RS resources configured for a CSI process and RI based on the CRI may be transmitted together, whereby a channel state may be reported more efficiently.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 6 is a conceptual diagram illustrating a transmittable pattern of CSI-RS having 8 antenna ports in a resource block (RB) composed of 12 subcarriers in the LTE-A system.

BEST MODE FOR CARRYING OUT THE INVENTION

Figure 1:
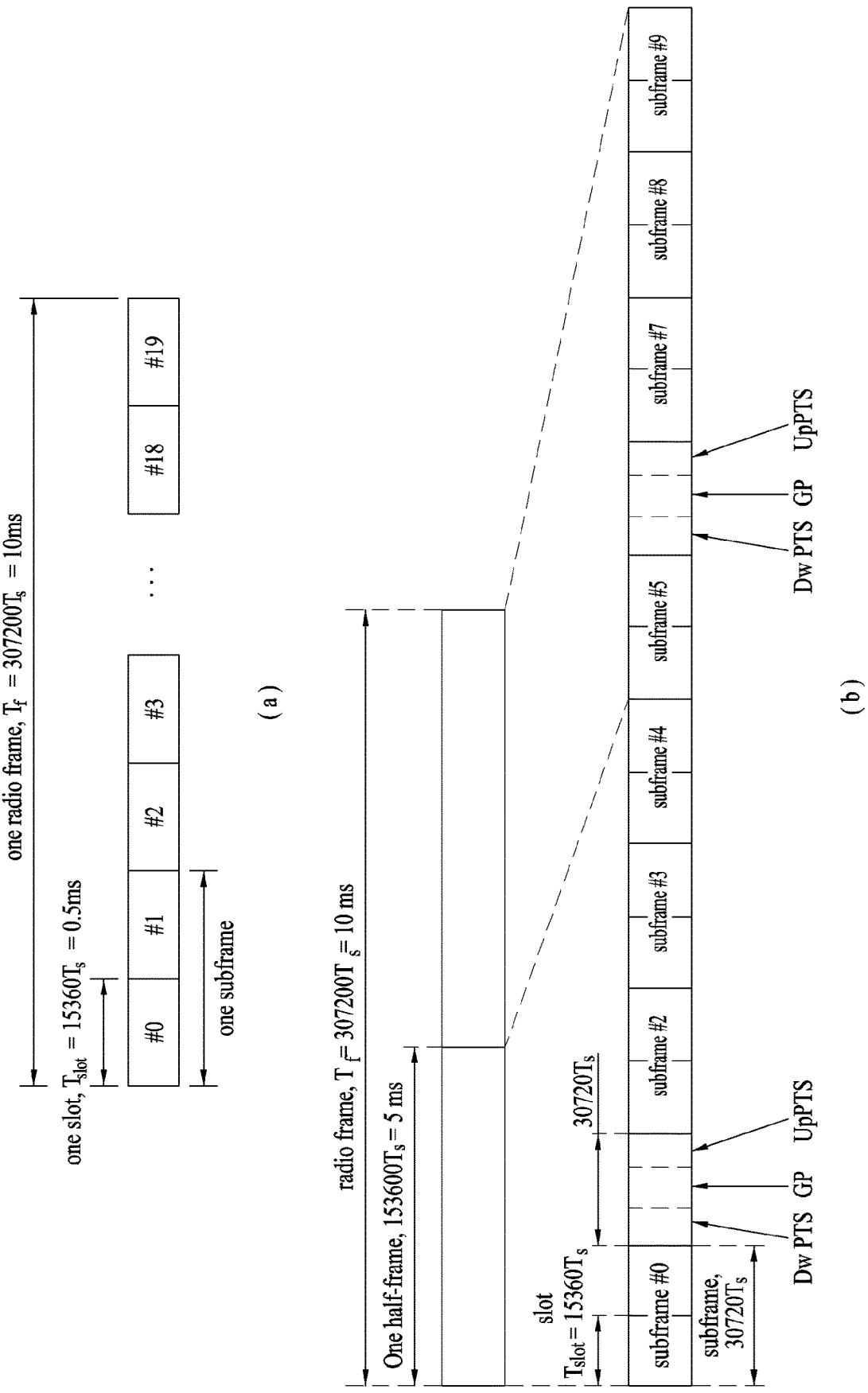
FIG. 1 exemplarily shows a radio frame structure for use in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e., single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to multiple nodes may control the nodes such that signals are simultaneously transmitted to or received from a UE through some or all nodes. While there is a difference between multi-node systems according to the nature of each node and implementation form of each node, multi-node systems are discriminated from single node systems (e.g., a centralized antenna system (CAS), conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes may be applied to various types of multi-node systems. For example, a node refers to an antenna group spaced apart from another node by a predetermined distance or more, in general. However, embodiments of the present invention, which will be described below, may even be applied to a case in which a node refers to an arbitrary antenna group irrespective of node interval. In the case of an eNB including an X-pole (cross-polarized) antenna, for example, the embodiments of the preset invention are applicable on the assumption that the eNB controls a node composed of an H-pole antenna and a node composed of a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |

TABLE 2-continued

|  | Normal cyclic prefix in downlink | | | Extended cyclic prefix in downlink | | |
| --- | --- | --- | --- | --- | --- | --- |
|  |  | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 7 | $21952 \cdot T_s$ |  |  | $12800 \cdot T_s$ | — | — |
| 8 | $24144 \cdot T_s$ |  |  | — | — | — |
| 9 | $13168 \cdot T_s$ |  |  | — | — | — |

Figure 2:
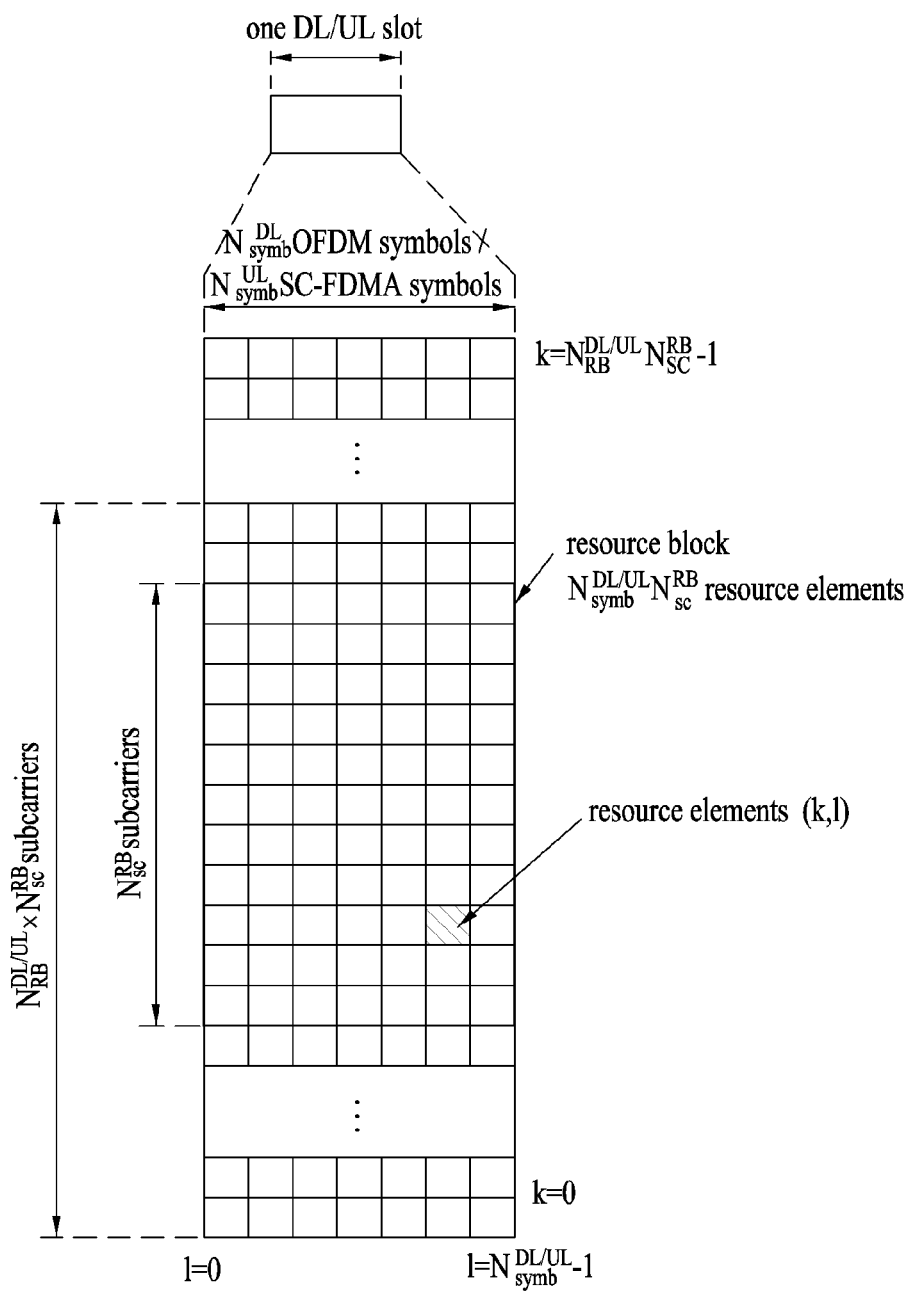
FIG. 2 exemplarily shows a downlink/uplink (DL/UL) slot structure for use in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k,l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
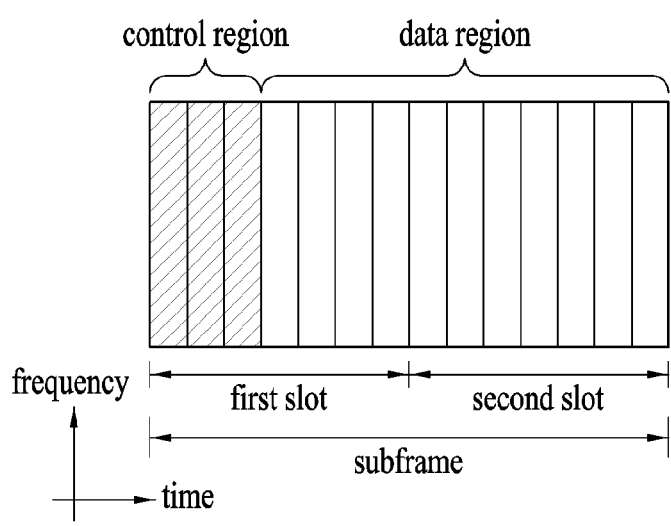
FIG. 3 exemplarily shows a downlink (DL) subframe structure for use in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Type | Search Space Aggregation Level L | Size [in CCEs] | Number of PDCCH candidates $M^{(L)}$ |
| --- | --- | --- | --- |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
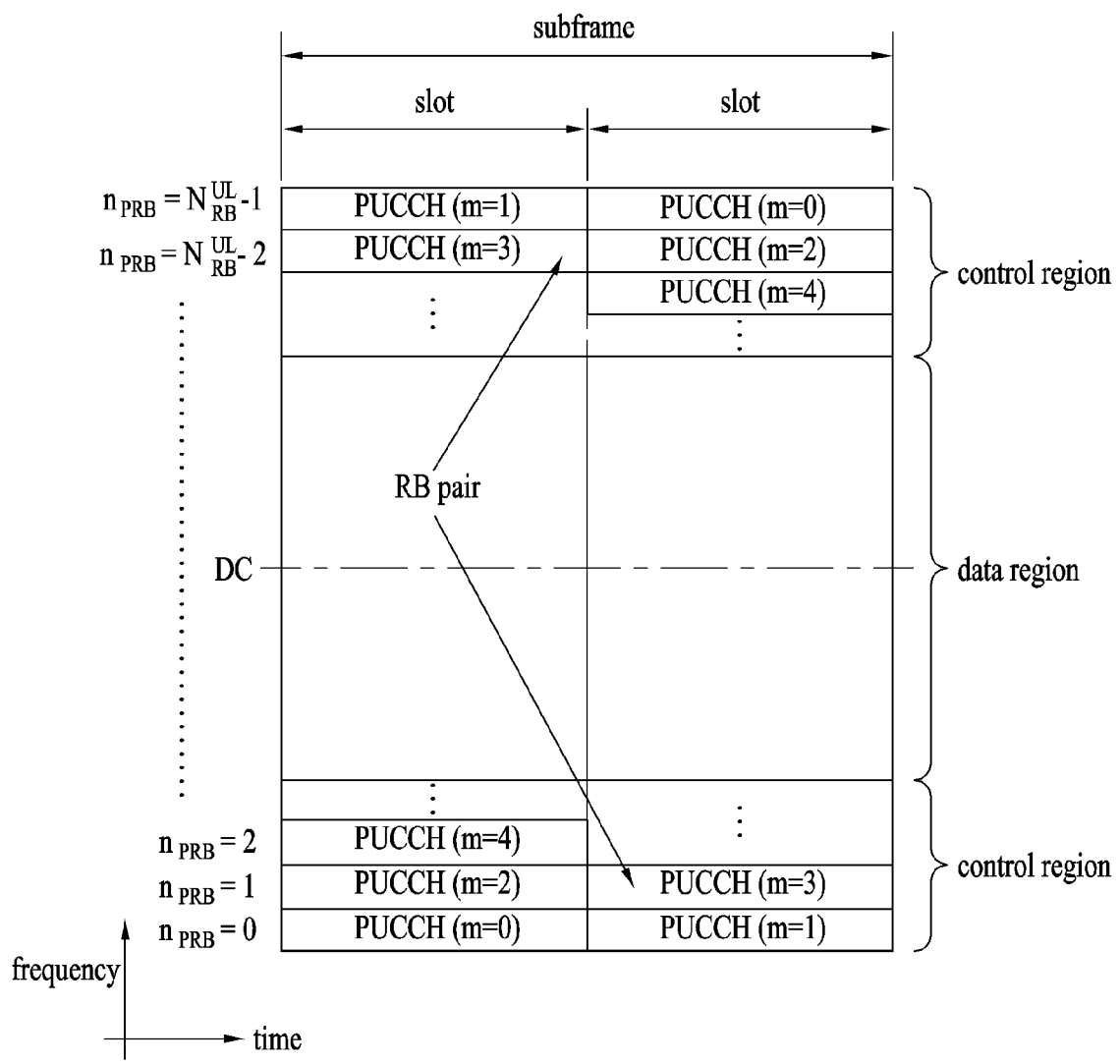
FIG. 4 exemplarily shows an uplink (UL) subframe for use in a 3GPP LTE/LTE-A system.
Figure 5:
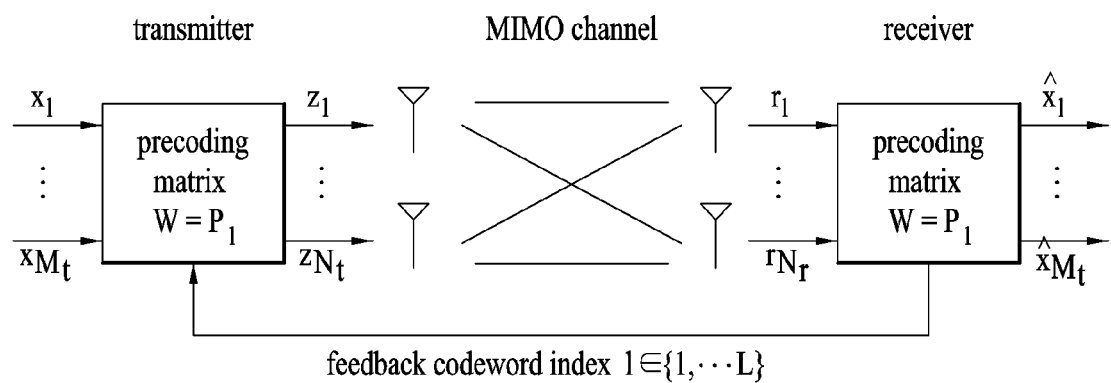
FIG. 5 is a conceptual diagram illustrating codebook based beamforming.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A(exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Codebook-Based Precoding

In order to support multi-antenna transmission, precoding for properly distributing information to be transmitted to the respective antennas according to the channel conditions may be employed. The codebook-based precoding technique refers to a technique of predetermining a precoding matrix set in a transmit terminal and a receive terminal, causing the receive terminal to measure channel information from the transmit terminal and feed back, to the transmit terminal, an indication (i.e., a precoding matrix index (PMI)) indicating the most appropriate precoding matrix and causing the transmit terminal to apply appropriate precoding to signal transmission based on the PMI. According to this technique, since an appropriate precoding matrix is selected in the predetermined precoding matrix set, feedback overhead may be reduced compared to the case of explicitly feeding back optimum precoding information through channel information even if optimum precoding is not always applied.

Figure 6:
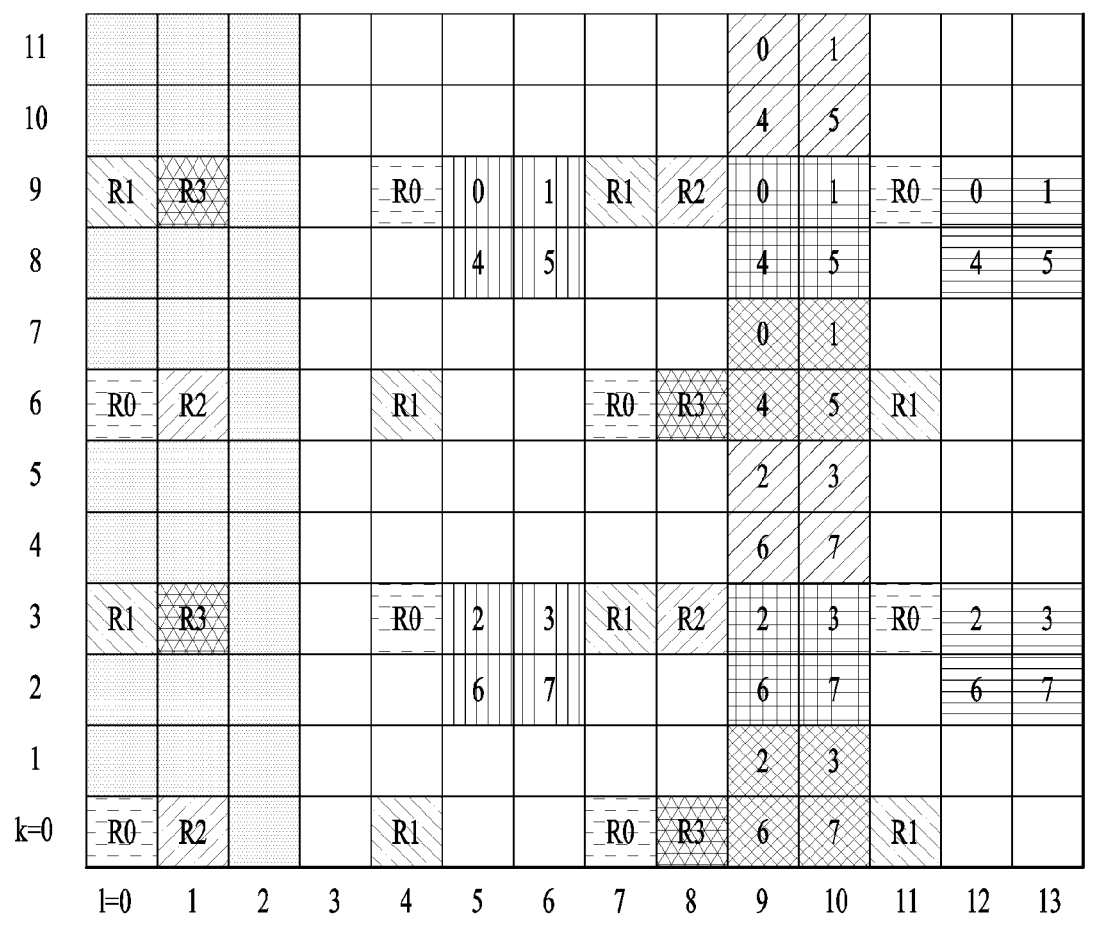

FIG. 6 illustrates the basic concept of codebook-based precoding.

According to the codebook-based precoding, the transmit terminal and receive terminal share codebook information including precoding matrices, the number of which is predetermined according to the transmission rank, the number of antennas, and the like. That is, the precoding-based codebook may be used if the feedback information is finite. The receive terminal may measure the channel state through a received signal, and feed back, to the transmit terminal, information about a finite number of preferred precoding matrices (namely, indexes of the corresponding precoding matrices). For example, the received terminal may measure the receive signal using the technique of maximum likelihood (ML) or minimum mean square error (MMSE), and select an optimum precoding matrix. While FIG. 6 illustrates that the receive terminal transmits, to the transmit terminal, precoding matrix information for respective codewords, embodiments of the present invention are not limited thereto.

Upon receiving feedback information from the receive terminal, the transmit terminal may select a specific precoding matrix in a codebook, based on the received information. Upon selecting the precoding matrix, the transmit terminal may perform precoding by multiplying layer signals, the number of which corresponds to a transmission rank by the selected precoding matrix, and transmit a transmit signal obtained through precoding via a plurality of antennas. The number of rows of the precoding matrix equals the number of antennas, and the number of columns of the precoding matrix equals the rank value. Since the rank value equals the number of layers, the number of columns of the precoding matrix equals the number of layers. For example, if the number of transmit antennas is 4, and the number of transmit layers is 2, the precoding matrix may be configured as a 4×2 matrix. Information transmitted through the respective layers using the precoding matrix may be mapped to the respective antennas.

Upon receiving the signal precoded and transmitted by the transmit terminal, the receive terminal may restore the received signal by performing reverse processing of the precoding performed by the transmit terminal. Typically, since a precoding matrix satisfies the criterion for a unitary matrix (U) such as $U*U^H=I$, the aforementioned reverse processing of the precoding may be implemented by multiplying the received signal by a Hermitian matrix $P^H$ for the precoding matrix P.

For example, Table 5 below shows a codebook used for downlink transmission using 2 transmit (Tx) antennas in 3GPP LTE Release-8/9, and Table 6 below shows a codebook used for downlink transmission using 4 Tx antennas in 3GPP LTE Release-8/9.

TABLE 5

| Codebook index | Number of rank | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1&0\\0&1\end{bmatrix}$ |
| 1 | $\frac{1}{\sqrt{2}}\begin{bmatrix}1\\-1\end{bmatrix}$ | $\frac{1}{2}\begin{bmatrix}1&1\\1&-1\end{bmatrix}$ |
| 2 | $\frac{1}{\sqrt{2}}\begin{bmatrix}1\\j\end{bmatrix}$ | $\frac{1}{2}\begin{bmatrix}1&1\\j&-j\end{bmatrix}$ |
| 3 | $\frac{1}{\sqrt{2}}\begin{bmatrix}1\\-j\end{bmatrix}$ | — |

TABLE 6

| Codebook index | $u_n$ | Number of layers v | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{124\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 6, $W_n^{\{s\}}$ is obtained with a set $\{s\}$ configured by an equation expressed as $W_n = I - 2u_n u_n^H / u_n^H u_n$. Herein, I denotes a 4×4 single matrix, and $u_n$ has a value given in Table 6.

As shown in Table 5, a codebook for 2 Tx antennas has 7 precoding vectors/matrices. Herein, since the single matrix is intended for an open-loop system, the number of factors/matrices for precoding of a closed-loop system becomes 6. A codebook for 4 Tx antennas as shown in Table 6 has 64 precoding vectors/matrices.

The codebooks described above have common features such as a constant modulus (CM) property, a nested property, constrained alphabet and the like. According to the CM property, no element in the precoding matrices in a codebook includes '0', and the respective elements have the same size. The nested property means that a precoding matrix of a lower rank is designed to be configured as a subset of a specific column of a precoding matrix of a higher rank. The constrained alphabet means that the respective elements in all precoding matrices in a codebook are constrained. For example, the elements of a precoding matrix may be constrained to elements (±1) used for binary phase shift keying (BPSK), elements (±1, ±j) used for quadrature phase shift keying (QPSK), or elements $$\left(\pm 1, \pm j, \pm \frac{(1+j)}{\sqrt{2}}, \pm \frac{(-1+j)}{\sqrt{2}}\right)$$

used for 8-PSK. In the example codebook of Table 6, since the alphabet of the respective elements of all precoding matrices in the codebook is configured by $$\left\{\pm 1, \pm j, \pm \frac{(1+j)}{\sqrt{2}}, \pm \frac{(-1+j)}{\sqrt{2}}\right\},$$

the codebook may be considered as having the constrained alphabet property.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MB-SFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

As described above, two downlink RSs (i.e., a cell-specific RS (CRS) and a UE-specific RS) have been defined for a unicast service in the LTE system. UE-specific RS may be used only for data demodulation, and CRS may be used not only for data demodulation but also for RRM measurement (such as CSI acquisition or handover). CRS may be transmitted to the entire system band every subframe, and RS for a maximum of 4 antenna ports may be transmitted according to the number of transmit (Tx) antennas of a base station (BS). For example, assuming that the BS includes two Tx antennas, CRSs for antenna ports #0 and #1 may be transmitted. Assuming that the BS includes four Tx antennas, CRSs for antenna ports (#0~#3) may be respectively transmitted.

The LTE-A system may support a maximum of 8 Tx antennas through downlink of the BS. If the LTE-A system transmits a reference signal (RS) for a maximum of 8 Tx antennas to the entire band at each subframe according to the same scheme as in CRS of the legacy LTE, RS overhead may excessively increase. Therefore, RS for use in LTE-A may be classified into a CSI-RS for CSI measurement for selecting MCS, PMI, etc. and a DM-RS for data demodulation in such a manner that two RSs may be added. Although CSI-RS can be used for RRM measurement, the CSI-RS has been designed for CSI acquisition. CSI-RS is not used for data demodulation, such that the CSI-RS need not be transmitted at each subframe. Therefore, CSI-RS may be intermittently transmitted on a time axis so as to reduce CSI-RS overhead. For data demodulation, DM-RS may be dedicatedly transmitted to the UE scheduled in the corresponding time-frequency domain. That is, DM-RS of a specific UE may be transmitted only to the region (i.e., the time-frequency domain for receiving data) in which the corresponding UE is scheduled.

FIG. 6 is a conceptual diagram illustrating a transmittable pattern of CSI-RS having 8 antenna ports in a resource block (RB) composed of 12 subcarriers in the LTE-A system. RS for only one antenna port is spread throughout two OFDM symbols, and two RSs may share two REs and may be identified by the orthogonal codes. For example, RS denoted by numbers 0 and 1 may indicate two REs to which CSI-RS ports #0 and #1 are transmitted. For convenience of description and better understanding of the present invention, CSI-RS port #0 or #1 may be used. In order to discriminate between other kinds of RSs (e.g., CRS or UE-specific RS), CSI-RS port #0 or #1 may have an index #15 or #16. CSI-RS may include not only port #8 but also other ports (#1, #2, #4).

Figure 7:
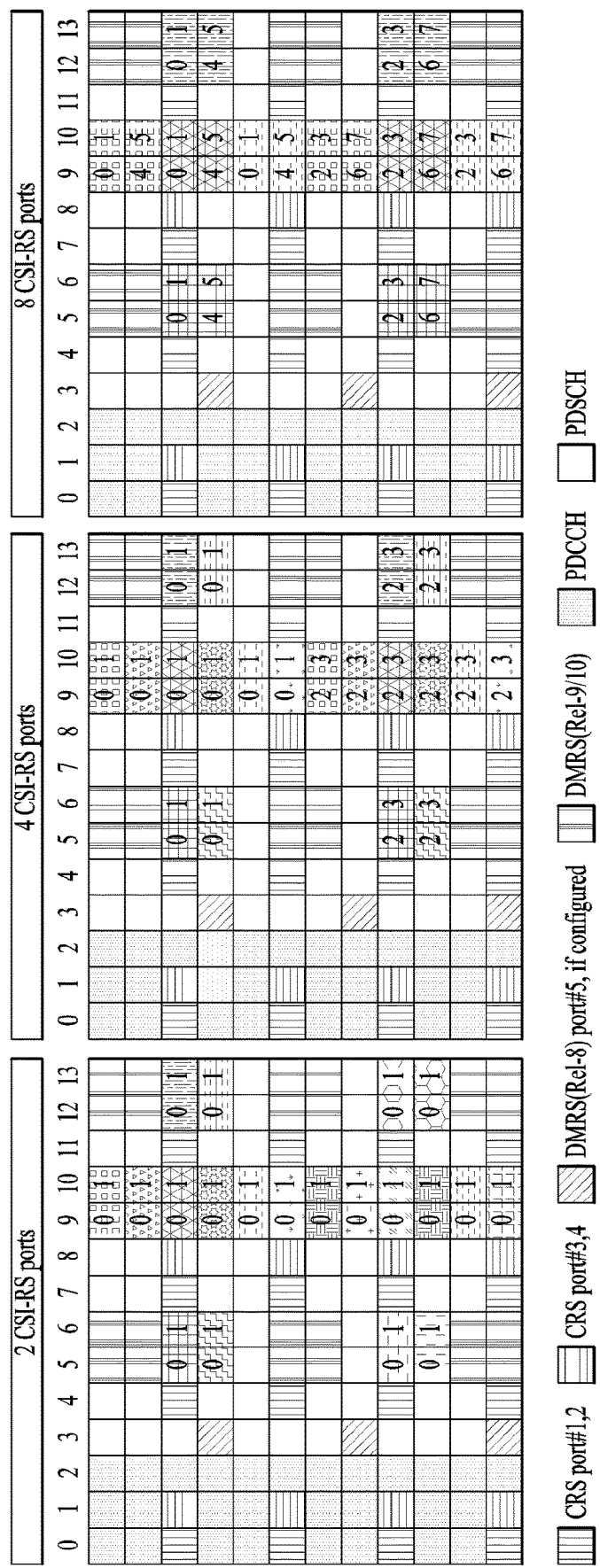
FIG. 7 is a conceptual diagram illustrating 2-port, 4-port, and 8-port CSI-RS transmission patterns.

In a method for transmitting a normal CP as shown in Table 7, the positions of Tx REs of the N-port CSI-RS may be denoted by a subcarrier index (k), an OFDM symbol index (l), and a slot index (0. As can be seen from Table 7, 8-port CSI-RS commonly applied to the frame structure type (FDD mode) and the Type 2 (TDD mode) of the LTE system may have only 5 Tx patterns in only one subframe. FIG. 7 shows 2-port, 4-port, and 8-port CSI-RS transmission patterns.

TABLE 7

| CSI-RS configuration | Number of CSI-RSs configured | | | | | |
|---|---|---|---|---|---|---|
| | 1 or 2 | | 4 | | 8 | |
| | (k', l') | $n_{smod2}$ | (k', l') | $n_{smod2}$ | (k', l') | $n_{smod2}$ |
| FS-1 and FS-2 | | | | | | |
| 0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (7, 2) | 1 | (7, 3) | 1 | (7, 8) | 1 |
| 4 | (9, 5) | 1 | (9, 6) | 1 | (9, 5) | 1 |
| 5 | (8, 5) | 0 | (8, 5) | 0 | | |
| 6 | (10, 2) | 1 | (10, 2) | 1 | | |
| 7 | (8, 2) | 1 | (8, 2) | 1 | | |
| 8 | (8, 2) | 1 | (8, 2) | 1 | | |
| 9 | (8, 5) | 1 | (8, 5) | 1 | | |
| 10 | (3, 5) | 0 | | | | |
| 11 | (2, 5) | 0 | | | | |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |
| 17 | (0, 2) | 1 | | | | |
| 18 | (3, 5) | 1 | | | | |
| 19 | (2, 5) | 1 | | | | |

CSI-RS configuration for use in the current LTE standard is composed of antennaPortsCount, subframeConfig, resourceConfig, etc., such that the CSI-RS configuration may indicate how many antenna ports are used for CSI-RS transmission, may indicate the period and offset of the subframe to which CSI-RS will be transmitted, and may indicate which RE position (frequency and OFDM symbol index) within the corresponding subframe is used for CSI-RS transmission. In more detail, the BS may transmit the following information when transmitting specific CSI-RS configuration to the UE.

antennaPortsCount: This is a parameter (e.g., 1 CSI-RS port, 2 CSI-RS ports, 4 CSI-RS ports, or 8 CSI-RS ports) for indicating the number of antenna ports used for CSI-RS transmission.

resourceConfig: This is a parameter indicating the position of CSI-RS allocation resource.

subframeConfig: This is a parameter indicating a subframe period and an offset to be used for CSI RS transmission.

p-C: This is a parameter for UE assumption for a reference PDSCH transmit (Tx) power for CSI feedback CSI-RS. Pc is the ratio of CSI-RS EPRE to PDSCH EPRE (energy per resource element) when a user equipment (UE) has [−8, 15]dB values as the 1 dB step during calculation of the CSI feedback.

zeroTxPowerResourceConfigList: This is a parameter for zero-power CSI-RS configuration.

zeroTxPowerSubframeConfig: This is a parameter for the subframe period and offset to be used for transmission of a zero power CSI-RS.

Introduction of the active antenna system (AAS) is considered in the evolved wireless communication systems. The AAS refers to a system in which each antenna includes an active element such as an amplifier, differently from a conventional passive antenna system in which the amplifier capable of adjusting the phase and magnitude of a signal is separated from the antenna. The AAS is efficient in terms of energy and operation cost since the AAS uses active antennas and thus does not require an additional cable, connector, hardware and the like to connect the amplifier to antennas. In addition, since the AAS supports electronic beam control for each antenna, the AAS enables enhanced MIMO technology such as formation of an accurate beam pattern in consideration of a beam direction and a beam width or formation of a three-dimensional (3D) beam pattern.

Figure 8:
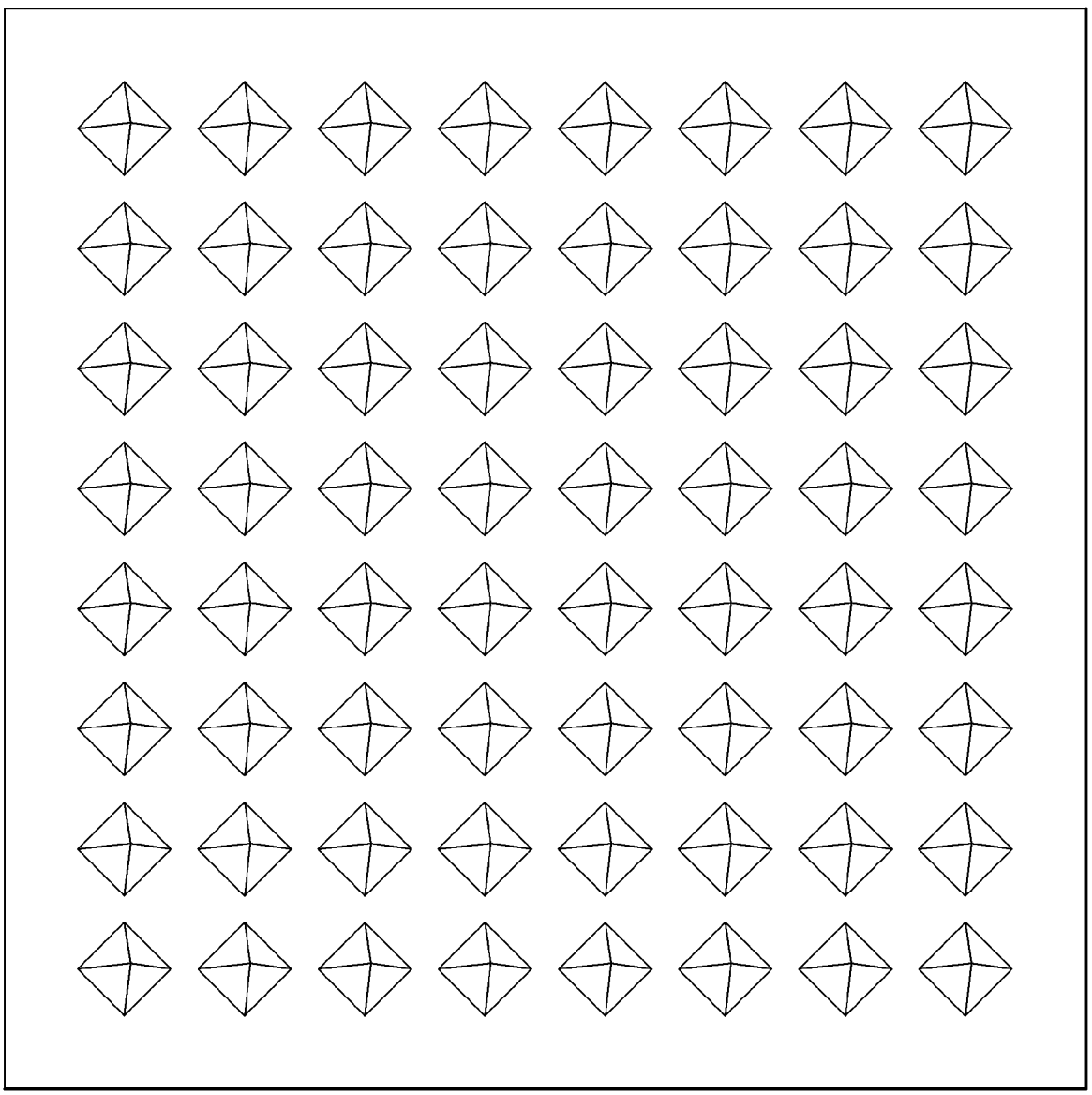
FIG. 8 is a conceptual diagram illustrating a two-dimensional (2D) antenna array.

With the introduction of an enhanced antenna system such as the AAS, a large-scale MIMO system having a plurality of input/output (I/O) antennas and a multi-dimensional antenna structure is considered. For example, when a two-dimensional (2D) antenna array instead of a conventional linear antenna array is formed, a three-dimensional (3D) beam pattern can be generated according to active antennas of the AAS. $N_r$ (i.e., $N_t = N_v \cdot N_h$) antennas may have a square shape as a general 2D antenna array as shown in FIG. 8. $N_h$ is the number of antenna columns, and $N_v$ is the number of antenna rows.

Figure 9:
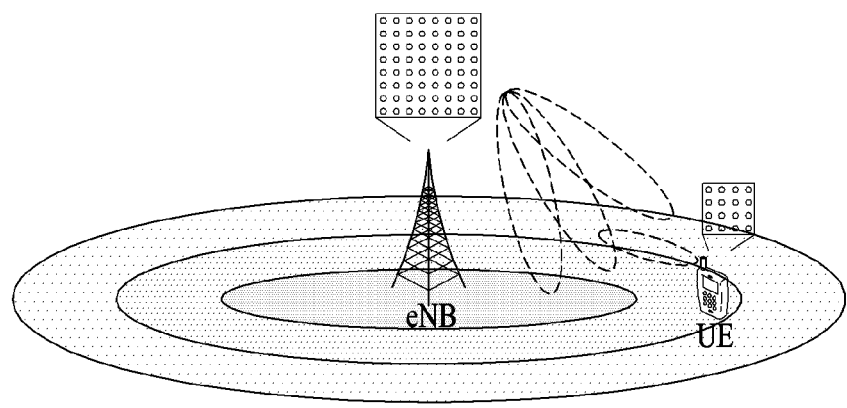
FIG. 9 is a conceptual diagram illustrating a 3D beam-pattern based on the 2D antenna array.

When using the 3D beam pattern in terms of Tx antenna, semi-static or dynamic beam may be formed not only in the horizontal direction of the beam, but also in the vertical direction of the beam. For example, application of the vertical directional sector formation may be considered. In addition, when the receive (Rx) beam is formed using large-scale antennas in terms of the Rx antenna, signal power may increase according to the antenna array gain. On uplink, the BS may receive signals from the UE through the plurality of antennas. In this case, the UE may have a very low Tx power in consideration of large-scale Rx antennas so as to reduce influence of interference. FIG. 9 is a conceptual diagram of the above-mentioned example, and is a conceptual diagram illustrating the system including a plurality of Tx/Rx antennas through which the BS or UE can form the AAS-based 3D beam.

In the present invention, antenna ports of reference signals (RS) transmitted to the same OFDM (orthogonal frequency division multiplexing) symbol in FDM(frequency division multiplexing)+TDM(time division multiplexing) scheme are grouped and physical antenna elements are also grouped so that each antenna port within the antenna port group may be transmitted through a plurality of antenna elements of different antenna element groups. In the suggested method, a codebook of a precoding matrix for data transmission and CSI report may be used by combining a selection codebook for antenna port group selection with a constant modulus codebook for determining a beam pattern which will be used in the selected antenna group.

In the suggested method, the selection codebook may be used to indicate information as to some of antenna port groups which will be used, and the constant modulus codebook may be used to indicate information as to precoding which will be applied to ports within the corresponding antenna port group.

Transmission Power Restriction Per Antenna

Assuming that the number of BS antennas is $N_t$ and the maximum Tx power of the BS transmitter is set to $P_t$[Watt], the maximum Tx power capability for each antenna may be denoted by $P_a = P_t/N_t$ that is considered most efficient in terms of the size and cost of the antenna amplifier. In this case, the amplifier per antenna is comprised of an independent element, such that Tx power exchange between the antenna amplifiers may be impossible. In other words, Tx power capability for each antenna must be fully consumed so that signals can be transmitted at a maximum Tx power of the BS transmitter.

In the OFDM transmission scheme, a specific subcarrier of the Tx OFDM symbol of each antenna port will hereinafter be referred to as a resource element (RE), and RE of the k-th subcarrier of the n-th OFDM symbol of the n-th antenna port is denoted by RE(k,l,n). Average energy to be transmitted for each RE of each antenna port will hereinafter be referred to as energy per resource element (EPRE). In the method for transmitting an OFDM composed of K subcarriers each having a transmission time (T), the entire average transmission energy obtained by the energy sum of all antennas for each RE may be denoted by $E_t = T \cdot P_t/K$. The average Tx energy (i.e., EPRE) for each RE of each antenna port may be denoted by $E_t = T \cdot P_a/K$. K subcarriers may be amplified and transmitted by a single amplifier, such that Tx power can be easily exchanged between the subcarriers. That is, the entire Tx energy of K subcarriers at the same OFDM symbol need not exceed the energy denoted by $K \cdot E_a$.

Antenna Port Mapping

An antenna port does not mean a substantial (physical) antenna element as a concept of a logical antenna. Therefore, the antenna port may be referred to as a virtual antenna, and the antenna element may be referred to as a physical antenna. A scheme for mapping each logical antenna port into a physical antenna element is important in designing a full MIMO system. As examples of an antenna mapping scheme, one-to-one mapping for mapping an antenna port into one antenna element and one-to-many mapping for mapping an antenna port into a plurality of antenna elements may be considered.

Mapping of antenna port into antenna element is expressed as a virtualization matrix B in the following Equation. In this case, x represents a transmitting signal in the antenna port, and z represents a transmitting signal in the antenna element. Although the number of antenna ports may be smaller than the number of antenna elements, for convenience of description, it is considered that the number of antenna ports is $N_t$. $b_n$ represents a virtualization vector indicating a mapping relation of the nth antenna port into antenna elements. If the number of non-zero elements of the virtualization vector $b_n$ is one, it means one-to-one mapping scheme, and if the number of non-zero elements of the virtualization vector $b_n$ is a plural number, it means one-to-many mapping scheme.

Equation 1

$$z = Bx = [b_0 b_1 \ldots b_{N_t-1}]x \qquad \text{[Equation 1]}$$

In this case, it is assumed that a virtualization vector is normalized to $\|b_n\| = 1$ such that signal energy in the antenna port is the same as signal energy in the antenna element.

Data Precoding and Received Signal

For transmission of data having R Tx data layers, the Tx data symbol vector may be transmitted through each of the $N_t$ antennas through precoding as denoted by the following equation 2. In order to implement Tx power denoted by the maximum power ($P_t$), the precoding matrix (W) may allow the respective elements to have the same size (i.e., $|w_{i,j}|^2 = 1/$ R). The number (R) of data layers simultaneously transmitted may be referred to as the number of streams or the number of ranks.

$$x = \sqrt{E_a}\, Ws = \sqrt{E_a} \begin{bmatrix} w_{0,0} & w_{0,1} & \cdots & w_{0,R-1} \\ w_{1,0} & w_{1,1} & \cdots & w_{1,R-1} \\ \vdots & \vdots & \ddots & \vdots \\ w_{Nt-1,0} & w_{Nt-1,1} & \cdots & w_{Nt-1,R-1} \end{bmatrix} \begin{bmatrix} s_0 \\ s_1 \\ \vdots \\ s_{R-1} \end{bmatrix}. \quad \text{[Equation 2]}$$

$$z = Bx = \sqrt{E_a}\, BWs = \sqrt{E_a} \begin{bmatrix} w'_{0,0} & w'_{0,1} & \cdots & w'_{0,R-1} \\ w'_{1,0} & w'_{1,1} & \cdots & w'_{1,R-1} \\ \vdots & \vdots & \ddots & \vdots \\ w'_{Nt-1,0} & w'_{Nt-1,1} & \cdots & w'_{Nt-1,R-1} \end{bmatrix} \begin{bmatrix} s_0 \\ s_1 \\ \vdots \\ s_{R-1} \end{bmatrix}. \quad \text{[Equation 3]}$$

The Tx signal of Equation 3 may be received by the receiver having N. Rx antennas after passing through the channel, and the received signal may be denoted by the following equation. In following Equation, H may be a ($N_r \times N_t$) channel matrix, and n may be an ($N_r \times 1$) noise vector.

$$y = Hx + n = \sqrt{E_a} HWs + n. \quad \text{[Equation 4]}$$

For data demodulation, the effective channel (H·B·W) must be recognized, and a method for directly estimating the effective channel through DM-RS transmission may also be possible. However, the channel matrix (H·B) must be estimated to determine the precoding matrix (W) for maximizing Tx efficiency.

$$H \cdot B = \tilde{H} = [\tilde{h}_0 \tilde{h}_1 \ldots \tilde{h}_{N_t-1}]. \quad \text{[Equation 5]}$$

The effective channel matrix $\tilde{H}$ may be expressed as $N_t$ channel column vectors like Equation 5, wherein $\tilde{h}_n$ represents an effective channel between the n-th transmitting antenna port and $N_r$ receiving antennas. The effective channel matrix is estimated in such a manner that RS is independently transmitted from each antenna port to individually estimate each effective channel vector $\tilde{h}_n$. The RS for each antenna port should be transmitted for accuracy of channel estimation through orthogonal resources. That is, in the Equation 2, to transmit RS for the 0-th antenna port, a precoding matrix is a column vector of which rank is 1, and should have all elements of 0 except the first element, that is, $|w_i|^2 = 0$, $(i \neq 0)$. In this case, it is preferable that the first element $w_0$ has a size of $\sqrt{N_t}$. This is to allow data symbols to have the same cell coverage as the data symbols are transmitted in the energy of $N_t \cdot E_a$.

FDM Transmission Scheme of RS

Figure 10:
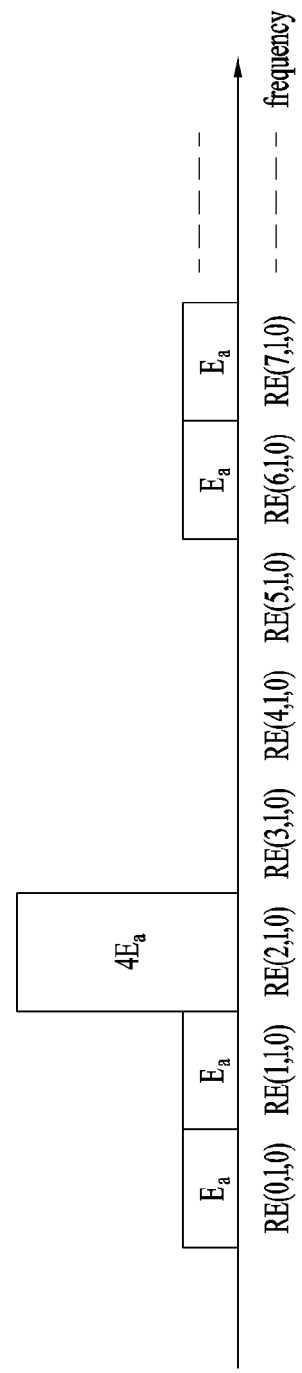
FIG. 10 is a conceptual diagram illustrating an Energy Per Resource Element (EPRE) of a specific antenna port.

In accordance with the scheme for FDM-processing the RS for the $N_t$ antenna ports and transmitting the FDM-processed RS, when RS of the $n_i$-th port is transmitted at RE($k_i$,l,$n_i$) and RS of the $n_j$-th port is transmitted at RE($k_j$,l,$n_j$), no signal is transmitted to RE($k_i$,l,$n_i$) and RE($k_j$,l,$n_j$), whereby RS Tx power may increase at RE($k_i$,l,$n_i$) and RE($k_j$,l,$n_j$). The reason why the above-mentioned operations are performed is that Tx power can be exchanged between the subcarriers. FIG. 10 is a conceptual diagram illustrating an exemplary EPRE transmitted to RE of the 0-th antenna port according to the scheme for transmitting the RS of the n-th antenna port to the subcarrier corresponding to k=2+n at $N_t$=4. The muting operation in which no signal is transmitted to prevent occurrence of RS interference transmitted from the other port in the 0-th antenna port at the RE having "k=3, 4, 5" is performed, such that energy transmittable at the corresponding RE may be transferred to RE(2,1,0) to which RS of the 0-th antenna port is transmitted, and the resultant energy is then transmitted. In FIG. 10, the data symbol is transmitted to RE having (k=0, 1, 6, 7), and the exemplary EPRE having the data symbol is shown. From the viewpoint of EPRE per antenna, EPRE of the RS transmission RE is larger than EPRE of the data transmission RE by a predetermined size corresponding to $N_t$ times, whereas the RS Tx energy may be identical to the data Tx energy from the viewpoint of energy of the sum of Tx energy of all antennas.

In order to measure the channel of the entire band in the frequency selective fading environment, RS may be repeatedly transmitted on the frequency domain at intervals of a predetermined time. RS must be transmitted at least one time at intervals of a channel coherence bandwidth ($BW_c$), such that the spacing of subcarriers to which the RS of the same antenna port is transmitted must be smaller than $T \cdot BW_c$. Assuming that a total number ($N_t$) of antennas is higher than $T \cdot BW_c$, it is impossible for all RSs for each of the $N_t$ antenna ports to be transmitted according to the FDM scheme. Therefore, the TDM or CDM scheme must be additionally considered to transmit a large number of RSs.

FDM+TDM Transmission Scheme of RS

Figure 11:
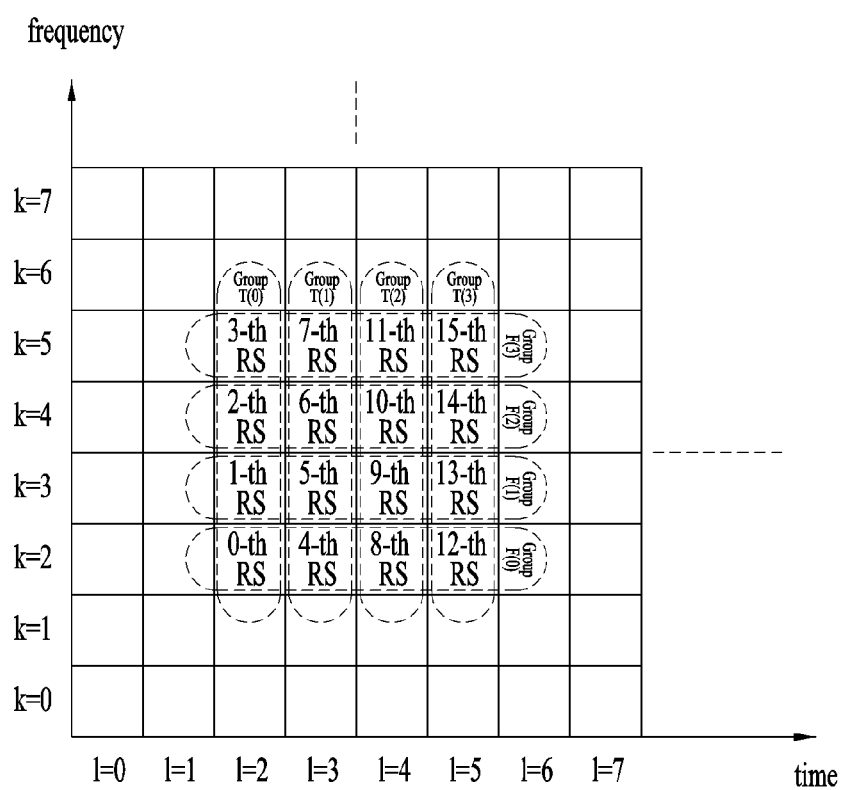
FIGS. 11 and 12 illustrate an antenna port group.

The FDM+TDM scheme may combine $M_f$ resources of the frequency domain with $M_t$ resources of the time domain, and may transmit $N_t$ RSs using $N_t = M_f M_t$ REs. FIG. 11 is a conceptual diagram of the FDM+TDM scheme, and may transmit 16 RSs to a total of 16 REs using 4 subcarriers and 4 OFDM symbols on the OFDM resource grid. The 0-th antenna port may transmit the RS to RE(2,2,0), and may perform muting at RE to which RS of the other antenna port is transmitted. Since Tx power can be exchanged between the subcarriers, Tx energy at RE(k,2,0) (where k=3, 4, 5) can be applied to RE(2,2,0). If Tx energy is transmitted at different times, Tx energy cannot be exchanged, such that it is impossible for the Tx energy at RE(k,1,0) (where k=2, . . . , 5, l=3, 4, 5) to be applied to RE(k,2,0).

Property of Antenna Virtualization Matrix

In this specification, an antenna port mapping method for enhancing transmission energy efficiency of RS transmission of FDM+TDM in a state that a transmission power restriction of an antenna element amplifier is given will be described. In this specification, antenna virtualization of the Equation 1 is applied to RS transmission scheme of FDM+TDM so that transmission energy of RS becomes $N_t \cdot E_a$. As an antenna mapping scheme, one antenna port is transmitted to an antenna element of $M_t$, whereby transmission capabilities of antenna elements of $M_t$ may all be used. As a result, in the RS transmission scheme of FDM+TDM, RS transmission energy is boosted $M_f$ times by transmission power exchange between RSs subjected to FDM. The transmission power is boosted $M_t$ times in accordance with one-to-many antenna mapping scheme, and then the transmission power is finally boosted $N_t$ times.

For convenience of description, antenna ports of RSs transmitted from the same OFDM symbol are formed as one group, whereby antenna ports are grouped disjointly. Considering antenna port index of FIG. 11, i·$M_f$-th antenna port to (i+1)·$M_f$-lth port are referred to as a group T(i). Also, $N_t$ antenna elements are divided into $M_t$ to form $M_f$ groups, whereby the ith antenna element group is referred to as group E(i).

In the suggested method, one antenna port is mapped into all antenna elements which belong to one antenna element group E(i). That is, one-to-one mapping is performed between one antenna port and one antenna element group. Also, antenna ports which belong to the same group T(i) are mapped into their respective antenna element groups different from each other. Grouping of antenna elements applied to the antenna port group T(i) may be different from that of antenna elements applied to the antenna port group T(j). However, in this specification, for convenience of description, the following description will be given based on that a grouping method of antenna elements is maintained. Particularly, a case that grouping from the (i·$M_f$)th antenna element to the ((i+1)·$M_f$-1)th antenna element is defined as a group E(i) will be described as a main example. In this case, antenna ports mapped into the same antenna element group are grouped and defined as an antenna port group F(i).

The suggested method will be described as a feature of an antenna virtualization matrix. The antenna virtualization matrix B of the Equation 1 is expressed as a matrix of $M_t$ as expressed by the following Equation.

$$B = [C_0 C_1 \ldots C_{M_f-1}].$$ [Equation 6]

In this case, $C_n$ represents a virtualization matrix applied to the nth antenna port group T(n). $C_n$ may be expressed as a column vector of $M_t \times 1$ like the following Equation.

$$C_n = \begin{bmatrix} c_{n,0} & 0 & \cdots & 0 \\ 0 & c_{n,1} & \cdots & 0 \\ \vdots & \vdots & \ddots & \vdots \\ 0 & 0 & \cdots & c_{n,M_f-1} \end{bmatrix}.$$ [Equation 7]

In this case, 0 represents a zero vector of $M_r \times 1$, and $C_{n,i}$ represents a virtualization vector of $M_r \times 1$, wherein this Equation represents how the ith antenna port of the antenna port group T(n) is mapped into the antenna element group E(i). In the virtualization matrix of the Equation 7, each column vector has only one non-zero element. This is to allow each antenna element to be mapped into one antenna port within the antenna port group T(n).

In the suggested method, all elements of the column vector $C_{n,i}$ are non-zero, have the same size, and are orthogonal between $C_{n,i}$ and $C_{m,i}$ to have independent channel property between antenna ports. To facilitate a design of a virtualization vector, $M_r \times 1$ virtualization matrixes applied to the antenna port group T(n) may be equally $C_{n,i} = C_{n,j}$.

Since the ith antenna port of the antenna port group T(n) is mapped into the same group E(i) by the Equations 6 and 7, the group F(i) is formed. In the embodiment of FIG. 11, the group E(i) includes $M_t$ antenna ports spaced apart from the ith antenna port at $M_f$ intervals. In the embodiment, each antenna port which belongs to group F(i) is transmitted to different OFDM symbols of the same subcarrier. In the suggested method, although RSs of the antenna ports which form group T(n) should be transmitted from the same OFDM symbol, RSs of ports which belong to group T(n) and group T(n+1) do not need to be transmitted to continuous OFDM symbols.

Application to 2D AAS

Figure 12:
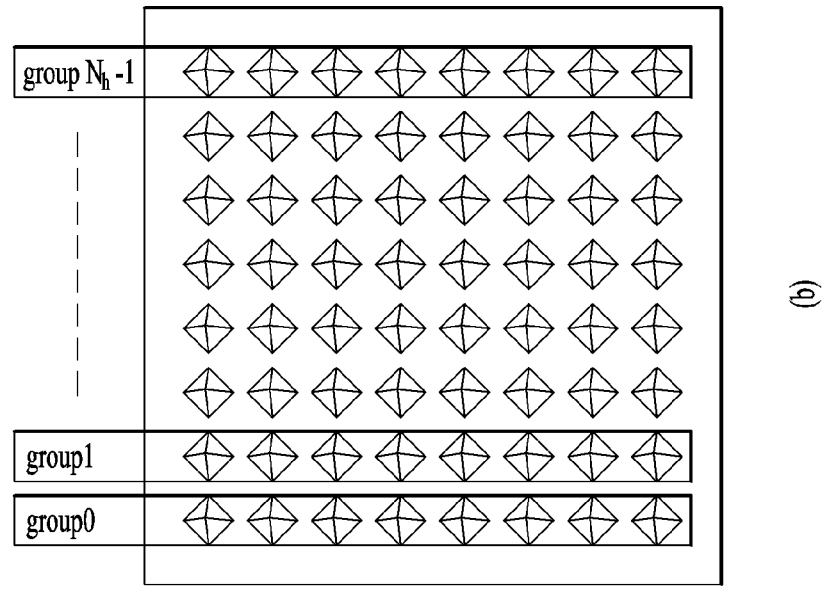
Figure 12:
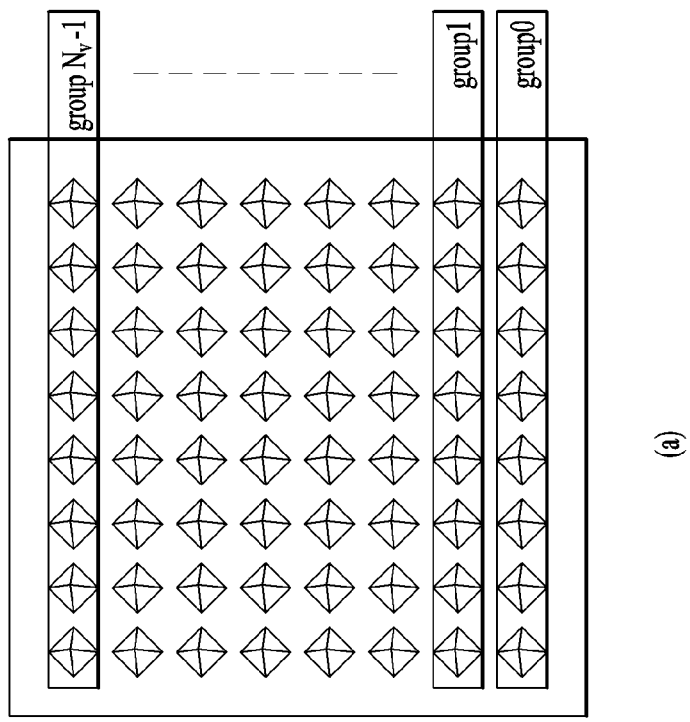

In this section, the suggestions in this specification will be described based on the example applied to 2D AAS of FIG. 12. In 2D AAS, a group of antenna elements into which RS port is mapped in accordance with one-to-many mapping may be applied to a group configured by antenna rows in a horizontal direction or a group configured by antenna columns in a vertical direction. In case of a former case (FIG. 12(a)), the number of antenna elements per group is set to $M_f = N_h$, and the number of groups is set to $M_f = N_v$. Unlike this case, in case of the latter case (FIG. 12(b)), the number of antenna elements per group is set to $M_f = N_v$, and the number of groups is set to $M_f = N_h$.

In FIG. 12(a), one antenna port is mapped into $N_h$ antenna elements, whereby $N_v$ antenna ports form a group T(n), whereby corresponding RSs are transmitted from the same OFDM symbol. In FIG. 12(b), one antenna port is mapped into $N_v$ antenna elements, whereby $N_h$ antenna ports form a group T(n), whereby corresponding RSs are transmitted from the same OFDM symbol.

Codebook Property of 2D AAS, Kronecker Product

In 2D AAS, a beam shape on a three-dimension may be expressed by product of horizontal beams and vertical beams if an interval of antenna elements becomes smaller. Therefore, as a codebook which will be used in the 2D AAS, a codebook comprised of a matrix expressed as a kronecker product of a precoding matrix $W_D^{(H)}$ of a horizontal antenna and a precoding matrix $W_D^{(V)}$ of a vertical antenna is considered. The example of FIG. 12(a) is expressed like the following Equation 8 by an indexing order of the antenna ports of FIG. 11, and a kronecker product is expressed like the following Equation 9 in case of FIG. 12(b).

$$W_D = W_D^{(H)} \otimes W_D^{(V)}$$ [Equation 8]

$$W_D = W_D^{(V)} \otimes W_D^{(H)}$$ [Equation 9]

In this case, if a rank of $W_D^{(H)}$ is $R_H$ and a rank of $W_D^{(V)}$ is $R_V$, a rank of an entire precoding is $R_H \cdot R_V$. A set of precoding matrixes of a horizontal antenna is defined as a horizontal antenna codebook $CB^{(H)}(N_h)$, and a set of precoding matrixes of the vertical antenna is defined as a vertical antenna codebook $CB^{(V)}(N_v)$.

Considering a mapping scheme between the aforementioned antenna ports and the aforementioned antenna elements, a selection codebook is used as the horizontal antenna codebook and a constant modulus codebook is used as the vertical antenna codebook in case of FIG. 12(a). Unlike this, a selection codebook is used as the vertical antenna codebook and a constant modulus codebook is used as the horizontal antenna codebook in case of FIG. 12(b). In this case, the selection codebook means a codebook having a matrix formed with column vectors of one non-zero element as a precoding matrix, and the constant modulus codebook means a codebook having a matrix formed with elements of the same size as a precoding matrix. This codebook configuration is performed such that each element of a final precoding matrix B·W used for the transmitting signal of the Equation 3 has the same size.

In the suggested method, the selection codebook indicates groups of $M_t$ antenna port groups T(n), which will be used, and the constant modulus codebook indicates precoding applied to antenna ports within the corresponding antenna port group.

Method for Configuring Selection Codebook

An antenna port selection codebook of antenna size N includes selection vectors of one non-zero element as precoding vectors of rank=1, and a precoding matrix of rank>1 includes a matrix, each row of which is expressed as a selection vector. Table 8 illustrates an example of a precoding matrix corresponding to rank=1 and 2 in a selection codebook of antenna size 4. The antenna port selection codebook of antenna size N may have a codebook of rank M as much as the number for selecting M from N, that is, combination(N,M).

Also, the antenna ports may be divided into a plurality of antenna port sets and the codebook of rank M may be restricted to select M antenna ports within the same antenna port set. For example, if the antenna port set in the antenna port selection codebook of antenna size N is divided into 2, the number for selecting M from N/2 ports within each of 2 antenna port sets, that is, 2*combination(N/2,M) may exist in the codebook of rank M. This case is normalized such that the antenna port set is divided into G in the antenna port selection codebook of antenna size N. In this case, the number for selecting M from N/G ports within each of G antenna port sets, that is, G*combination(N/G,M) may exist in the codebook of rank M.

The suggested method is applied to the case that all of transmission beams of N antenna ports are not orthogonal. In the suggested method, antenna ports of which transmission beams are orthogonal are only configured as a set. That is, transmission beams are orthogonal between ports within the antenna port set. Transmission beams may not be orthogonal between ports which belong to different antenna port sets. Therefore, the codebook of rank M ensures orthogonality between transmission layers by selecting only antenna ports within the same antenna port set.

A maximum rank of the antenna port selection codebook may be designated previously, and the codebook that may be used in each rank may be restricted by a bitmap indicator of RRC signaling.

TABLE 8

| Rank = 1 | Rank = 2 |
| --- | --- |
| $\begin{bmatrix}1\\0\\0\\0\end{bmatrix}, \begin{bmatrix}0\\1\\0\\0\end{bmatrix}, \begin{bmatrix}0\\0\\1\\0\end{bmatrix}, \begin{bmatrix}0\\0\\0\\1\end{bmatrix}$ | $\begin{bmatrix}1&0\\0&1\\0&0\\0&0\end{bmatrix}, \begin{bmatrix}1&0\\0&0\\0&1\\0&0\end{bmatrix}, \begin{bmatrix}1&0\\0&0\\0&0\\0&1\end{bmatrix},$ $\begin{bmatrix}0&0\\1&0\\0&1\\0&0\end{bmatrix}, \begin{bmatrix}0&0\\1&0\\0&0\\0&1\end{bmatrix}, \begin{bmatrix}0&0\\0&0\\1&0\\0&1\end{bmatrix}$ |

Normalization to Non-Kronecker Product Codebook

The present invention is normalized, and thus a codebook design and a CSI report scheme according to the codebook design corresponding to a normal case that three-dimensional beam shapes are not expressed by a product of horizontal beams and vertical beams due to a big interval of antenna elements in 2D AAS will be described. Hereinafter, the case of FIG. 12(b) will be described for convenience of description. However, the suggested method is equally applicable to the case of FIG. 12(a) through mutual exchange of V and H.

The normalized codebook of the suggested method is given as follows.

$$W_D = [w_0^{(V)} \otimes W_0^{(H)} w_1^{(V)} \otimes W_1^{(H)} \quad \ldots \quad w_{R_V-1}^{(V)} \otimes W_{R_V-1}^{(H)}]. \quad \text{[Equation 10]}$$

In this case, $W_D^{(V)} = [w_0^{(V)} w_1^{(V)} \ldots w_{R_V-1}^{(V)}]$.

In this case, $W_D^{(V)}$ is selected from the antenna port selection codebook, and $W_D^{(H)}$ is selected from the constant modulus codebook. $R_V$ indicates how many antenna port groups have been selected as a rank of $W_D^{(V)}$, and $W_r^{(V)}$ indicates which antenna port group has been selected in the rth order as an antenna port selection vector. $W_r^{(H)}$ indicates a precoding applied to the selected rth antenna port group. If a rank of $W_r^{(H)}$ is expressed as $R_H(r)$, a rank of total precoding is given as follows.

$$\sum_{r=0}^{R_V-1} R_H(r) \quad \text{[Equation 11]}$$

That is, the rank of the total precoding becomes a sum of ranks of the precoding matrix applied to each of the selected antenna port groups.

CSI-RS Configuration $N_t$ antenna port CSI-RSs to which the suggested method is applied are grouped into a plurality of groups, and RSs of antenna ports which belong to the same group are transmitted from the same OFDM symbol. That is, the antenna ports of RSs transmitted from the same OFDM symbol may form one group, or RSs of a plurality of antenna port groups may be transmitted from the same OFDM symbol. If $N_t$ antenna port CSI-RSs are grouped into $M_t$ groups, the number of RSs which belong to the mth RS group is defined as $M_f(m)$. In this case, the following relation should be satisfied.

$$N_t = \sum_{m=0}^{M_t-1} M_f(m) \quad \text{[Equation 12]}$$

The suggested method is normalized, whereby the number of antenna ports may be equal per group. In this case, $M_f(m) = N_t/M_t$ is given.

$N_t$ antenna port CSI-RSs to which the suggested method is applied are grouped into a plurality of groups, and transmission patterns of the legacy CSI-RSs in FIG. 7 are used for CSI-RSs of ports which belong to the same group. In this case, the number of antenna ports included in one group is selected from 1, 2, 4 or 8. The CSI-RSs of the ports which belong to the same group are transmitted by being multiplexed by the FDM+CDM scheme of FIG. 7. However, RSs of ports which belong to different groups may be transmitted to different OFDM symbols. In this structure, all CSI-RSs may be transmitted by FDM+CDM+TDM.

When the CSI-RS of the suggested method is configured for the UE by the base station, the following information is delivered by CSI-RS configuration:

the number of total antenna ports;
the number of antenna port groups;
the number of antenna ports per group;
position of CSI-RS transmission resource per group;
CSI-RS transmission period and offset per group; and
Pc per antenna port group.

In this case, Pc is a ratio of PDSCH EPRE and CSI-RS EPRE, and is a parameter assumed for CSI report by the UE, for determining quality of a PDSCH. In this case, a different Pc is applied to each antenna port group, whereby a different transmission power may be configured between data layers transmitted from each antenna port group.

Although a position of a CSI-RS transmission resource per antenna port group may be designated individually through CSI-RS configuration, only a CSI-RS transmission resource of the first group may be indicated and a CSI-RS transmission resource position of the other groups may be designated previously as a relative position of the first group. Although CSI-RS transmission period and offset may be configured equally in all antenna port groups, a different transmission period and offset per antenna port may be configured to enhance CSI-RS transmission efficiency. Particularly, when RSs of all antenna port groups of the CSI-RS are not transmitted at the same subframe due to a lack of resources, offset of a transmission subframe is designated differently per antenna port group even though RSs of all antenna port groups are transmitted at the same period.

Activation/Deactivation Per Antenna Port Group

The base station may stop transmission of a corresponding CSI-RS if it is determined that transmission of a specific CSI-RS is not required to reduce overhead for CSI-RS transmission. If the corresponding CSI-RS is a CSI-RS previously configured for UEs, the base station notifies the corresponding UEs that the corresponding CSI-RS has been deactivated, through MAC or RRC signaling, whereby CSI estimation for the corresponding CSI-RS is not performed any more.

This method is applied to CSI-RS configuration configured by a plurality of antenna port groups, whereby the base station notifies that CSI-RS transmission has been activated or deactivated per antenna port group. That is, the base station notifies the UE of a corresponding antenna port group of a corresponding CSI-RS configuration, which has been activated or deactivated, when notifying the UE of a CSI-RS activation/deactivation command The UE excludes the antenna port group deactivated by the activation/deactivation command of the base station from antenna port selection. That is, some of the antenna port selection codebooks is restricted automatically. As an example, if a command indicating that the fourth antenna port group has been deactivated is received in a state that CSI-RS configuration comprised of four antenna port groups is configured, a codebook for selecting the fourth antenna port group from the antenna port selection codebook of Table 8 is restricted automatically, whereby the UE does not select the corresponding codebook during CSI report.

CSI-RS Feedback

In this section, a CSI report scheme for CSI-RS configuration formed by a plurality of antenna port groups will be described.

In the suggested method, the UE reports information as to antenna port groups, which will be selected, by using the antenna port selection codebook. The number of antenna port groups which are selected is determined by a rank of an antenna port selection precoding matrix $W_D^{(V)}$ which is reported. Also, the UE reports information as to a precoding matrix $W_r^{(H)}$ which will be used for an antenna port group selected in the rth order to transmit data. At this time, a precoding matrix applied to the antenna port group is selected from a constant modulus codebook.

In the suggested method, the UE may report a rank $R_v$ and a precoding matrix $W_D^{(V)}$ for antenna port group selection for CSI report, and may report $R_V$ ranks $R_H(r)$ and a precoding matrix $W_r^{(H)}$ for precoding applied to each of the selected antenna port groups. Also, the UE reports CQI, which may be obtained when reported precoding matrixes are applied. In this case, a report period of each report item may be configured differently. As an example, a report period of a rank $R_V$ may be greater than or the same as a report period of the precoding matrix $W_D^{(V)}$. That is, if the rank $R_V$ is reported once per 500 subframes, $W_D^{(V)}$ may be configured to be reported once per 100 subframes. Also, the report period of the precoding matrix $W_D^{(V)}$ may be greater than or the same as the report period of the rank $R_H(r)$ or $W_r^{(H)}$. Also, the report period of the rank $R_H(r)$ may be greater than or the same as the report period of the precoding matrix $W_r^{(H)}$.

Also, an application frequency bandwidth of each report item may be configured differently. That is, each report item may be selected independently and reported in accordance with a result of channel measurement per bandwidth. A bandwidth size of each report item may be configured differently, As an example, a size of a bandwidth of which rank $R_V$ is determined independently may be greater than or the same as a bandwidth size of the precoding matrix $W_D^{(V)}$. That is, if the rank $R_V$ is determined and reported once per 100 RBs, $W_D^{(V)}$ may be determined and reported once per 20 RBs. Alternatively, the rank $R_V$ is reported as one value through a system bandwidth but may be reported per sub-bandwidth. Also, a determination bandwidth of the precoding matrix $W_D^{(V)}$ may be greater than or the same as that of the rank $R_H(r)$ or $W_r^{(H)}$. Also, the determination bandwidth of the rank $R_H(r)$ may be greater than or the same as that of the precoding matrix $W_r^{(H)}$. As an example, the precoding matrix $W_D^{(V)}$ is reported as one value through a system bandwidth but $W_r^{(H)}$ may be reported per sub-bandwidth.

As a modification of the suggested method, the UE may report a rank $R_H(m)$ and a precoding matrix $W_m^{(H)}$ applied to each of the antenna port groups for CSI report. That is, if the number of antenna port groups is $M_t$, the UE may report $M_t$ ranks $R_H(m)$ and the precoding matrix $W_m^{(H)}$. At this time, if the UE does not want data transmission from the mth antenna group, the UE reports $R_H(m)=0$ and does not report the precoding matrix $W_m^{(H)}$.

As a simplified case of the suggested method, the total precoding matrixes are expressed by Kronecker product of the Equation 9. In this case, the UE may report the rank $R_V$ and the precoding matrix $W_D^{(V)}$, and may report the rank $R_H$ and the precoding matrix $W_D^{(H)}$ for precoding applied to the selected antenna port groups. Also, the UE may report CQI, which may be obtained when the reported precoding matrixes are applied. If a report period of CSI information X is expressed as Period (X), Period($R_V$)≥Period($W_D^{(V)}$)≥Period($R_H$)≥Period($W_D^{(H)}$) may be configured. Alternatively, Period($R_V$)≥Period($R_H$)≥Period($W_D^{(V)}$)≥Period($W_D^{(H)}$) may be configured.

Also, if a determination bandwidth of CSI information X is expressed as Bw(X), Bw($R_V$)≥Bw($W_D^{(V)}$)≥Bw($R_H$)≥Bw($W_D^{(V)}$) may be configured. Alternatively, Bw($R_V$)≥Bw($R_H$)≥Bw($W_D^{(V)}$)≥Bw($W_D^{(H)}$) may be configured. For example, the UE determines and reports $R_V$, $W_D^{(V)}$, and $R_H$ as one value through a full system bandwidth, and reports $W_D^{(H)}$ per sub-bandwidth. Alternatively, as an example, the UE determines and reports $R_V$ and $R_H$ as one value through a full system bandwidth, and reports $W_D^{(H)}$ and $W_D^{(V)}$ respectively per sub-bandwidth.

In the transmission scheme of the Equation 9, in case of $R_H=2$, a first data layer and a second data layer are transmitted through the same antenna port group. To transmit continuous data layers through different antenna port groups, the precoding matrix of the Equation 9 should be modified as follows.

$$W_D = \lfloor W_D^{(V)} \otimes w_0^{(H)} W_D^{(V)} \otimes w_1^{(H)} \quad . \quad . \quad . \\ W_D^{(V)} \otimes w_{R_H-1}^{(H)} \rfloor. \quad \text{[Equation 13]}$$

In this case, $W_D^{(H)} = \lfloor w_0^{(H)} w_1^{(H)} \ldots w_{R_H-1}^{(H)} \rfloor$.

Grouped antenna ports of CSI-RS configuration to which antenna port grouping suggested in the present invention is applied may be defined as sub-CSI-RS, whereby CSI-RS configuration comprised of a plurality of sub-CSI-RSs may be configured. Alternatively, super CSI-RS configuration may be considered by combination of a plurality of CSI-RS configurations.

Figure 13:
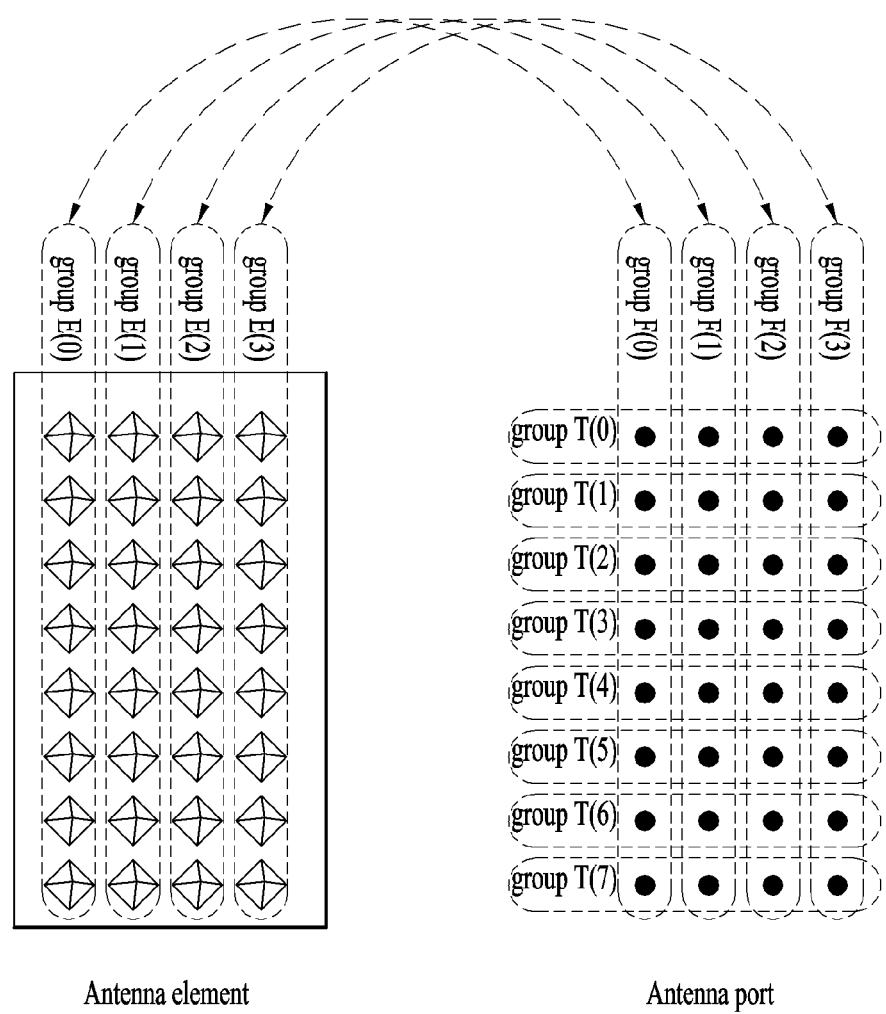
FIG. 13 illustrates a mapping relation of an antenna port group and an antenna element group.

The case that the present invention is applied to 2D AAS having 32 antenna elements will be described with reference to FIG. 13. A left side of FIG. 13 illustrates physical antennas as 32 antenna elements. A right side of FIG. 13 illustrates logical antennas as 32 antenna ports. FIG. 13 illustrates a grouping scheme of antenna elements and a grouping scheme of antenna ports, and also illustrates mapping between antenna elements and antenna ports.

The embodiment of FIG. 13 corresponds to FIG. 12(b) in which antenna elements are grouped by vertical antenna columns. In this case, the antenna elements are divided into 4 groups E(0), E(1), E(2) and E(3). 32 antenna ports are divided into 4 groups, whereby group F(0), F(1), F(2) and F(3) are formed. As an example of the suggested method, antenna ports which belong to group F(i) are virtualized using all antenna elements which belong to group E(i). Virtualization vectors of the respective antenna ports which belong to group F(i) are configured differently. Also, one port is selected from each antenna port group to form group T(i). Each antenna port which belongs to group T(i) is mapped into its respective antenna element group using the same virtualization vector. RS for each antenna port which belongs to group T(i) is transmitted to the same OFDM symbol.

If a Kronecker product of two codebooks is used as a codebook, which will be used in the 2D AAS, like the Equations 8 and 9 by enlargement of the suggested method, or if two types of codebooks are configured in combination like the Equations 10 and 11, one codebook may be used as the constant modulus codebook, and the other codebook may be used by being selected from the antenna port selection codebook and the constant modulus codebook. This method has flexibility that select and use a codebook in accordance with a CSI-RS transmission scheme of the base station. In this case, the UE is designated to report CSI by using the antenna port selection codebook or the constant modulus codebook. Specifically, the base station may designate that the codebook which will be applied to $W_D^{(V)}$ is the antenna port selection codebook or the constant modulus codebook, through RRC signaling for transmitting MIMO transmission mode.

If a Kronecker product of two codebooks is used as a codebook, which will be used in the 2D AAS, like the Equations 8 and 9 by enlargement of the suggested method, or if two types of codebooks are configured in combination like the Equations 10 and 11, one codebook may be used as the constant modulus codebook, and the other codebook may be used as a mixed codebook of an antenna port selection precoder and a constant modulus precoder. In this case, the base station may apply a codebook restriction to the mixed codebook in accordance with the CSI-RS transmission scheme, whereby a specific type of precoder, that is, the antenna port selection precoder or the constant modulus precoder may only be used.

CSI-RS Feedback Rank Restriction

In the suggested method, a rank $R_V$ for antenna port group selection may previously be restricted to several specific values. That is, the rank $R_V$ may be restricted to be selected from 1 and 2 only. Alternatively, the base station may restrict a value, which may be owned by the rank $R_V$, through RRC signaling for transmitting MIMO transmission mode. Also, a rank $R_H(r)$ applied to each of the selected antenna port groups may previously be restricted to several specific values. Alternatively, a rank of total precoding in the Equation 12 may be restricted to several specific values. Representatively, the rank of total precoding in the Equation 12 may be restricted so as not to exceed the number of receiving antennas of the UE or the number of maximum data rates. Alternatively, a maximum value of the rank $R_H(r)$ applied to each of the antenna port groups may be restricted to a specific value or less by a transmission feature of each antenna port group. The maximum value $R_H(r)$ applied to each of the antenna port groups and a maximum value of the rank of the total precoding may be notified by the base station to the UE through RRC signaling for transmitting MIMO transmission mode.

Prior to the description of the present invention, technical elements based on the present invention will be described in detail. In the present invention, a feedback operation of channel information through independent CSI feedback configuration will be referred to as a CSI process. Therefore, the base station may configure one or more CSI processes for each UE, and the configuration information may be provided in the form of RRC signaling.

Conventionally, the base station has configured one or more CSI processes through RRC signaling, and one CSI-RS resource and one CSI-IM (Interference Measurement) resource have been configured per CSI process. The present invention suggests that the CSI process is enlarged to include one or more CSI-RS resources and/or one or more CSI-IM resources. At this time, the CSI-RS resource means a resource used when the UE measures CSI, and the CSI-IM resource means a resource used when the UE performs interference estimation during CSI measurement. Therefore, the base station may provide the UE with configuration information on a CSI process for which one or more CSI-RS resources and one or more CSI-IM resources are configured, wherein the configuration information may be provided in the form of RRC signaling. At this time, the CSI-IM resource may be configured in accordance with a transmission mode. For example, the CSI-IM resource may not be configured for the CSI process in case of transmission mode 9, and the CSI-IM resource may be configured for the CSI process in case of transmission mode 10.

The present invention suggests a method for enabling a UE to select an antenna group and report CSI (Channel State Information) for the selected antenna group in a system that antenna ports are grouped and the antenna ports for each group transmit signals in different directions (specifically, three-dimensional direction for transmitting or receiving signals to or from antenna ports for each group). Alternatively, the present invention suggests a method for reporting CSI for CSI-RS resource selected by a UE in a system for allocating CSI-RS resources independent per antenna port group. As a detailed example, the present invention suggests various embodiments in which a selected antenna port group index, beam index or CSI-RS resource index is multiplexed with random one of various kinds of CSI information and then transmitted through a PUSCH.

In the present invention, if a three-dimensional direction for transmitting or receiving signals per antenna port group is configured differently, an antenna port group index which is an indicator for a specific antenna port group may be understood as the same meaning as a beam index which is an indicator for a specific signal transmission direction. Also, if CSI-RS resources different per antenna port group are matched or allocated, CSI-RS resource index which is an indicator for a specific CSI-RS resource may be understood as the same meaning as the antenna port group index.

Hereinafter, technical configuration of the present invention will be described in detail.

In the present invention, directions of transmission beams may be configured differently per antenna group by using mapping between antenna ports and antenna elements different per antenna group. Representatively, a vertical angle of transmission beams may be configured differently per antenna group. As a detailed example, antenna port group 1 may be configured to transmit a signal in a direction of a zenith angle of 100° and antenna port group 2 may be configured to transmit a signal in a direction of a zenith angle of 110°. In this case, in the suggested method of the present invention, a selection operation of the antenna port group may be referred to as a selection operation of a transmission beam direction. In other words, the selected antenna port group index has the same meaning as the selected beam index.

If a plurality of CSI-RS resources are configured for a CSI process by the base station and antenna ports of each CSI-RS resource are grouped into one group, that is, if CSI-RS resources independent per antenna port are allocated, the selected beam index described in the present invention has the same meaning as the selected CSI-RS resource index. That is, "antenna port group" may mean each CSI-RS resource unit included in a specific CSI process. Also, selection of a specific antenna port group may correspond to an operation for selecting a specific CSI-RS resource. In this way, the CSI process applicable to the present invention is associated with K CSI-RS resources/configurations, and a certain number of antenna ports may be associated with each CSI-RS resource. For example, the kth CSI-RS resource may be associated with Nk antenna ports (in this case, k=0, . . . , K−1). In this case, a value greater than or the same as 1 may be applied to K.

The present invention suggests a method for selecting one antenna port group and reporting CSI of the corresponding group. Particularly, the present invention suggests a detailed method for CSI report in the case that the selected antenna port group includes a different number of ports. For example, the case that a first group has four antenna ports and second and third groups have two antenna ports when there are three antenna port groups will be described. In this case, if the UE selects one antenna port group and reports CI for the selected antenna port group, the UE should report CSI for 4-ports when the first group is selected in the above example, and should report CSI for 2-ports when the second and third groups are selected. As a main example to which this configuration is applicable, a DAS (distributed antenna system) in which antenna ports are installed in physically different positions may be considered. In this case, the number of antennas may be different per transmission point, and the antenna port group may be allocated to each point. This technical configuration may be applied to a method for selecting one CSI-RS resource to which a certain number of antenna ports are associated and reporting CSI for the corresponding CSI-RS resource.

CSI includes one or more of RI(Rank Indicator), PMI (Precoding Matrix Indicator), and CQI(Channel Quality Indicator). At this time, a bit length of PMI which is reported is configured differently depending on the number of antenna ports. In the LTE standard, 2-port PMI is defined as a 2-bit length, and 4-port PMI is defined as a 4-bit length. Also, a total bit length of 4-port PMI is varied depending on which one of a Rel.8 codebook and a dual PMI codebook will be used. Generally, if the number of antenna ports is increased, the number of bits of PMI is also increased. Also, a bit length of CQI is defined differently depending on RI which is reported. In the legacy LTE standard, if CSI is reported through PUSCH, since the number of bits of PMI and CQI is varied depending on the selected rank, RI is reported through a resource different from resources of PMI and CQI as shown in FIG. 14.

Figure 14:
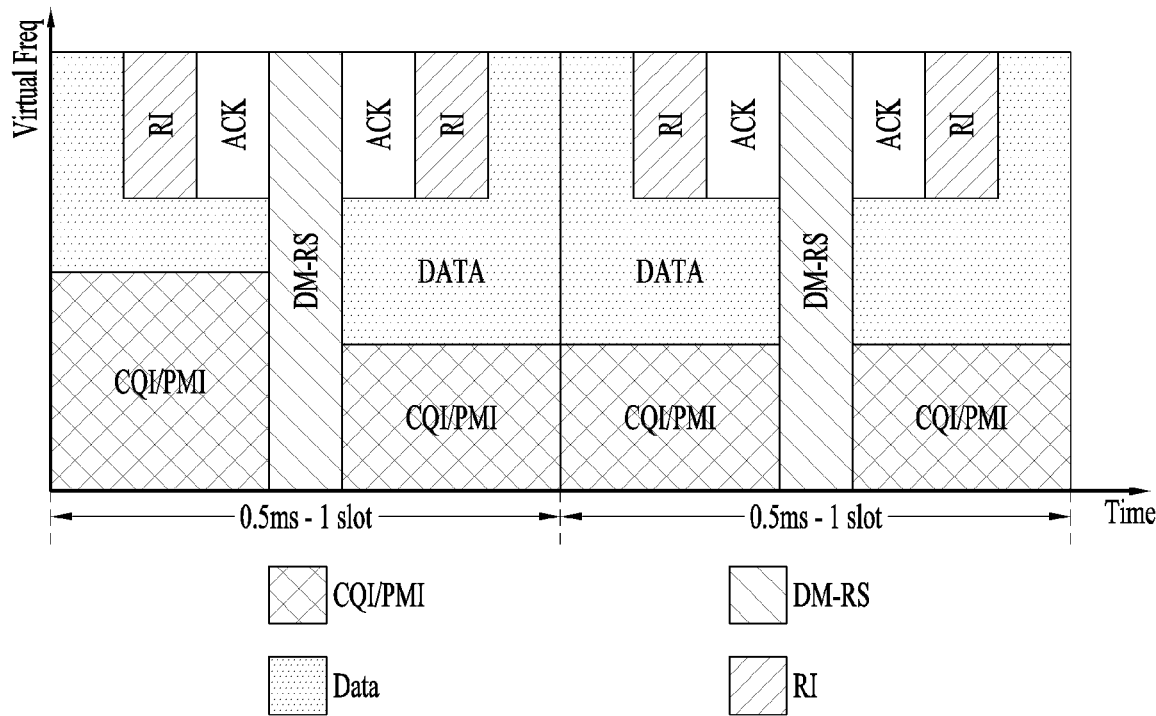
FIG. 14 illustrates a resource element to which DM-RS, ACK/NACK, RI, and CQI are transmitted when CSI is reported through PUSCH in the LTE standard technology.

FIG. 14 illustrates a resource element to which DM-RS, ACK/NACK, RI, and CQI are transmitted when CSI is reported through PUSCH in the LTE standard technology.

In FIG. 14, ACK/NACK is transmitted through 4 OFDM symbols adjacent to OFDM symbol transmitted through DM-RS, and RI is transmitted through 4 OFDM symbols adjacent to OFDM symbol to which ACK/NACK is transmitted. That is, RI is transmitted through 2rd, 6th, 9th, and 13th OFDM symbols at a subframe of a normal CP comprised of 14 OFDM symbols #1 to #14. A receiver of the base station first receives RI to identify the reported rank, identifies a bit length of the reported CQI/PMI in accordance with the rank, and thus receives CQI/PMI.

Also, the RI is transmitted through 1st, 5th, 7th, and 11th OFDM symbols of a total of 12 OFDM symbols #1 to #12 at a subframe of an extended CP. The receiver of the base station first receives RI to identify the reported rank, identifies a bit length of the reported CQI/PMI and a length of a transmitted coded bit, and receives CQI/PMI in accordance with the identified length.

Hereinafter, in various suggested methods according to the present invention, a detailed method for multiplexing BI(Beam Index/Indicator) or CRI(CSI-RS Resource Index/Indicator) with CSI and transmitting the multiplexed result will be suggested. As described above, it is assumed that a three-dimensional direction for transmitting or receiving a signal per antenna port group is configured differently and different CSI-RS resources are matched or allocated per antenna port group. In this case, BI may be understood as the same meaning as CRI. Therefore, in the present invention, BI or CRI will be described without identification from each other. For convenience of description, BI or CRI is marked with [BI or CRI].

Also, the present invention may be enlarged to the embodiment in which one or more CSI-IM resources are additionally configured for a CSI process. In other words, CSI-IM resource may not be configured for a specific CSI process described in the present invention, or one or more CSI-IM resources may be configured for the specific CSI process.

In the first suggested method, since bits of reported CSI may be varied depending on the selected antenna port group or CSI-RS resource, a method for reporting the selected antenna port group index, the selected beam index (BI) or the selected CSI-RS resource index (CRI) together with RI will be suggested. At this time, if the UE reports CSI through a PUSCH, [BI or CRI] and RI may be transmitted through 2rd, 6th, 9th, and 13th OFDM symbols of a total of 14 OFDM symbols #1 to #14 of a subframe of a normal CP. [BI or CRI] and RI may be transmitted through 1st, 5th, 7th, and 11th OFDM symbols of a total of 12 OFDM symbols #1 to #12 at a subframe of an extended CP. Therefore, the receiver of the base station may first receive [BI or CRI] and RI to identify a rank of the reported [BI or CRI]+RI, identify an information bit length of the reported CQI/PMI and a length of a transmitted coded bit, and receive CQI/PMI in accordance with the identified length.

[BI or CRI] and RI of the present invention are used to determine an information length of PMI/CQI. Therefore, the base station should normally receive all of [BI or CRI] and RI from the UE to normally receive PMI/CQI. Therefore, the method for transmitting [BI or CRI] and RI by combining and encoding [BI or CRI] and RI in the same manner as the first suggested method is advantageous that [BI or CRI] and RI may be transmitted more reliably than the method for transmitting [BI or CRI] and RI by independently encoding [BI or CRI] and RI.

In the 1-1th suggested method which is a detailed embodiment, a method for transmitting [BI or CRI] and RI through concatenation will be suggested. At this time, [BI or CRI] and RI may be transmitted by being encoded by block coding. A length $n_{BI\ or\ CRI}$ of [BI or CRI] is determined by an antenna port group configured for a CSI process or the number $n_G$ of CSI-RS resources and may be given as expressed by the following Equation. In this case, if the number of CSI-RS resources configured for the CSI process or the number of antenna port groups is 1, the length of [BI or CRI] becomes 0, whereby [BI or CRI] may not be transmitted. In other words, only RI may be transmitted without transmission of [BI or CRI].

$$n_{BI\ or\ CRI} = \log_2(n_G) \quad \text{[Equation 14]}$$

A length $n_{RI}$ of RI is a function of a maximum value of a maximum rank $R_{k,max}$, which may be owned by the kth antenna group, and may be given as follows.

$$n_{RI} = \log_2\left(\max_k (R_{k,max})\right) \quad \text{[Equation 15]}$$

Various methods may be used as concatenation methods of [BI or CRI] and RI. For example, [BI or CRI] may first be arranged and then RI may be arranged. Alternatively, RI may first be arranged and then [BI or CRI] may be arranged. In this suggested method, a length of a total of information bits transmitted after concatenation may be defined as $n_{BI\ or\ CRI} + n_{RI}$.

If the 1-1th suggested method is enlarged to the method for reporting CSI for a plurality of CSI processes and a plurality of component carriers (CCs), a concatenated pair of [BI or CRI] and RI concatenated in accordance with carrier index, cell index or process index order may be applied to CSI reported by the UE. In this case, in each carrier and CSI per CSI process, a concatenated pair of [BI or CRI] and RI may be concatenated in accordance with an increasing order of CSI process index and then an increasing order of index or cell index of a component carrier. For example, if a first CSI process and a second CSI process are configured for each of a first component carrier CC and a second component carrier CC, the UE may generate channel state information for the first CSI process and the second CSI process respectively configured for the first component carrier CC and the second component carrier CC such that a pair including [BI or CRI] and RI is concatenated or combined as illustrated in the following Table. At this time, channel state information for the first CSI process of the first component carrier may be located in the MSB (Most Significant Bit), or may be located subsequently to other information.

TABLE 9

| * * * | First CC & First CSI process [BI or CRI] + RI | First CC & Second CSI process [BI or CRI] + RI | Second CC & First CSI process [BI or CRI] + RI | Second CC & Second CSI process [BI or CRI] + RI | * * * |
|---|---|---|---|---|---|
| (MSB) Most Significant Bit | | | | | (LSB) Least Significant Bit |

Alternatively, unlike the above example, RIs of a plurality of cells or component carriers may be concatenated sequentially and then [BI or CRI] of the plurality of cells or component carriers may be concatenated sequentially. If only one antenna port group is defined or the legacy CSI report method follows in case of a specific cell/component carrier or CSI process, [BI or CRI] may not be configured so as not to be reported.

In the 1-2th suggested method, a beam and rank index (BRI) in which [BI or CRI] (=1, . . . , K) and RI(=1, . . . , $R_{k,max}$) are combined is newly defined, and is transmitted during CSI report. In this case, $R_{k,max}$ means a maximum value of RI when [BI or CRI] is a value of k. The following Equation illustrates an example that BRI is defined from [BI or CRI] and RI.

$$BRI = RI + \sum_{k=1}^{(BI\ or\ CRI)-1} R_{k,max} \quad \text{[Equation 16]}$$

Table 10 illustrates an example that BRI value according to [BI or CRI] and RI based on the above Equation is expressed as a table. For example, if three antenna port groups or CSI-RS resource groups are configured, the first group has 4 antenna ports and the second and third groups have two antenna ports, the BRI value according to [BI or CRI] and RI may be expressed as follows. At this time, if a value of [BI or CRI] is 2 and a value of RI is 2, 6 may be applied to the BRI value based on the above Equation.

TABLE 10

| | | RI | | | |
|---|---|---|---|---|---|
| | | 1 | 2 | 3 | 4 |
| BI or CRI | 1 | 1 | 2 | 3 | 4 |
| | 2 | 5 | 6 | | |
| | 3 | 7 | 8 | | |

In this case, BRI length $n_{BRI}$ is given as follows.

$$n_{BRI} = \log_2\left(\sum_{k=1}^{K} R_{k,max}\right) \quad \text{[Equation 17]}$$

If the 1-2th suggested method is enlarged to the method for reporting CSI for a plurality of CSI processes and a plurality of component carriers, BRI for each CSI may be concatenated in accordance with cell index or CSI process index.

Figure 15:
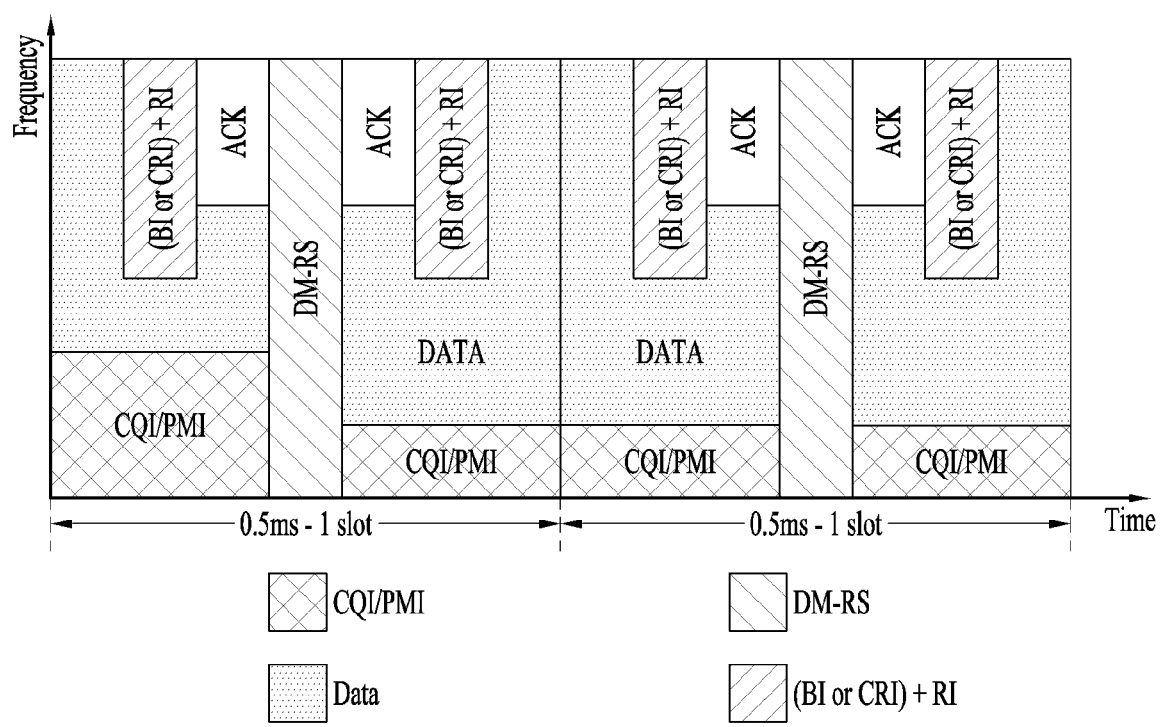
FIGS. 15 to 17 illustrate a method for transmitting channel state information in accordance with the embodiment of the present invention.

FIG. 15 illustrates an example that [BI or CRI] is transmitted through a resource element position to which the legacy RI is transmitted, in accordance with the first suggested method. In this case, [BI or CRI] may be transmitted by being concatenated with RI in the same manner as the 1-1th suggested method, or [BI or CRI] and RI may be combined with each other and then transmitted in the form of BRI which is newly defined.

In the second suggested method, RI is independently transmitted in the same manner as the legacy method, and [BI or CRI] is reported together with PMI/CQI. At this time, a bit length of the reported CSI may be determined in accordance with a PMI bit length of CSI-RS resource or an antenna port group or a port group having a maximum number of ports among CSI-RS resources. In the suggested method, an actual length of PMI reported when the kth antenna group is selected is defined as $n_{PMI,k}$ and a maximum value of $n_{PMI,k}$ is defined as $n_{PMI,max}$. In this case, if the UE reports CSI by selecting the kth antenna group or CSI-RS resource, the UE may be configured to report CQI/[BI or CRI]/PMI and padding bits by adding $(n_{PMI,max}-n_{PMI,k})$ padding bits. A length of the added padding bits may be varied depending on the selected rank.

For example, a case that three antenna port groups exist, the first group has four antenna ports, and the second and third groups have two antenna ports will be described. It is considered that 2-port PMI has a 2-bit length and 4-port PMI has a 4-bit length. In this case, a bit length of PMI including the padding bits may be configured to have a 4-bit length. Therefore, if the second antenna group is selected, 2-bit PMI and padding bits of 2-bit length may be reported. Also, if PMI per subband is reported, padding bits may be configured to be added per subband. Also, if PMI is a dual PMI comprised of first PMI and second PMI, a size of the added padding bits may be determined by combining lengths of the two PMIs.

Particularly, in the 2-1th suggested method, a method for continuously concatenating PMIs and then adding padding bits as needed will be suggested. In the suggested method, the actual length $n_{PMI,k}$ of PMI reported when the kth antenna group is selected indicates an information length of all PMIs including the first PMI and the second PMI in case of a wideband PMI, a subband PMI and a dual PMI, which are transmitted in the corresponding CSI report mode. When the UE reports CSI by selecting the kth antenna group, $(n_{PMI,max}-n_{PMI,k})$ padding bits may be added after information rows of the PMIs, whereby CQI/[BI or CRI]/PMI and padding bits may be reported. That is, when CSI information rows are generated, the CSI information rows may be configured to be concatenated in the order of CQI, [BI or CRI], and PMI, and then may be configured to concatenate the padding bits. Alternatively, when the CSI information rows are generated, the CSI information rows may be configured to be concatenated in the order of [BI or CRI], CQI, and PMI. In this way, [BI or CRI] may be arranged before PMI such that the PMI length may first be identified.

Table 11 illustrates a bit length of CQI and PMI field in case of PUSCH CSI reporting mode 1-2 in the LTE standard. In this case, N indicates the number of subbands.

TABLE 11

| | Bit width | | | |
|---|---|---|---|---|
| | 2 antenna ports | | 4 antenna ports | |
| Field | Rank = 1 | Rank = 2 | Rank = 1 | Rank > 1 |
| Wideband CQI codeword 0 | 4 | 4 | 4 | 4 |
| Wideband CQI codeword 1 | 0 | 4 | 0 | 4 |
| Precoding matrix indicator | 2N | N | 4N | 4N |

For example, in the case that three antenna port groups exist, the first group has four antenna ports, and the second and third groups have two antenna ports, in the 2-1th suggested method, a field of CQI/[BI or CRI]/PMI and padding bits in PUSCH CSI reporting mode 1-2 may be expressed as illustrated in Table 12. As suggested in Table 12, if the UE selects rank=1, a length of a total of CSI bits which are transmitted has a length of 6+4N bits regardless of selection of 2-port antenna group or 4-port antenna group. If the UE selects rank=2, a length of a total of CSI bits has a length of 10+4N bits. That is, if the UE selects rank=1 and 2-port antenna group, padding bits of 2N bits are added, and if the UE selects rank=2 and 2-port antenna group, padding bits of 3N bits are added.

TABLE 12

| | Bit width | | | |
|---|---|---|---|---|
| | 2 antenna ports | | 4 antenna ports | |
| Field | Rank = 1 | Rank = 2 | Rank = 1 | Rank > 1 |
| Wideband CQI codeword 0 | 4 | 4 | 4 | 4 |
| Wideband CQI codeword 1 | 0 | 4 | 0 | 4 |
| Beam indicator | 2 | 2 | 2 | 2 |
| Precoding matrix indicator | 2N | N | 4N | 4N |
| Padding bits | 2N | 3N | 0 | 0 |

Also, in the second suggested method, a method for generating corrected PMI by adding padding bits to individual PMI and reporting the generated PMI will be suggested. For example, if a group having 4-port antennas and a group having 2-port antennas are mixed, 0 (zero) of 2 bits may be added to 2-port PMI of a 2-bit length to generate and report corrected PMI of a 4-bit length. At this time, the first PMI and the second PMI may be configured to be individually corrected in accordance with a CSI reporting mode in case of wideband PMI, subband PMI and dual PMI.

Also, in the suggested method, if a specific antenna group uses a single PMI codebook and the other antenna group uses a dual PMI, a dual codebook may be configured to be used as a codebook which is finally reported. That is, if one of the antenna port groups uses a dual PMI codebook, a dual codebook may be used as a codebook which is finally reported. At this time, if the UE reports PMI by selecting an antenna port group that uses a single PMI codebook, the first PMI may be configured to report zero padding bits.

The 2-2th suggested method may be operated effectively in a reporting mode of [BI or CRI] reported per subband. For example, if port group 1 or first CSI-RS resource is able to be selected at subband 1 and port group 2 or second CSI-RS resource is able to be selected at subband 2, a length of padding bits added to PMI reported per subband may be configured differently per subband. In the reporting mode of [BI or CRI] reported per subband, [BI or CRI] and PMI per subband may be configured in pairs and then reported. Alternatively, in case of the dual PMI codebook, [BI or CRI], the first PMI and the second PMI per subband may be configured to be reported together, or the first PMI of each of the CSI-RS resources or all antenna port groups may be configured to be reported and [BI or CRI] and the second PMI per subband may be configured in pairs to be reported. Alternatively, first single optimal PMI, which will commonly be applied to all antenna port groups or CSI-RS resources, may be reported, and [BI or CRI] and second PMI per subband may be configured in pairs to be reported together.

In the first suggested method and the second suggested method, the UE may be configured a codebook, which will be used per antenna port group or CSI-RS resource, from the base station through RRC signaling. If one codebook, which will be used by the number of antennas per port, is previously defined, such configuration is not required. However, if a plurality of codebooks can be used depending on the number of antennas per port, which one of the codebooks will be used may be designated. As a main example, in case of a 4-port codebook, which one of a Rel.8 codebook and a dual PMI codebook will be used may be configured from the base station through RRC signaling. This designation may be applied to all port groups or may be performed individually per port group.

Figure 16:
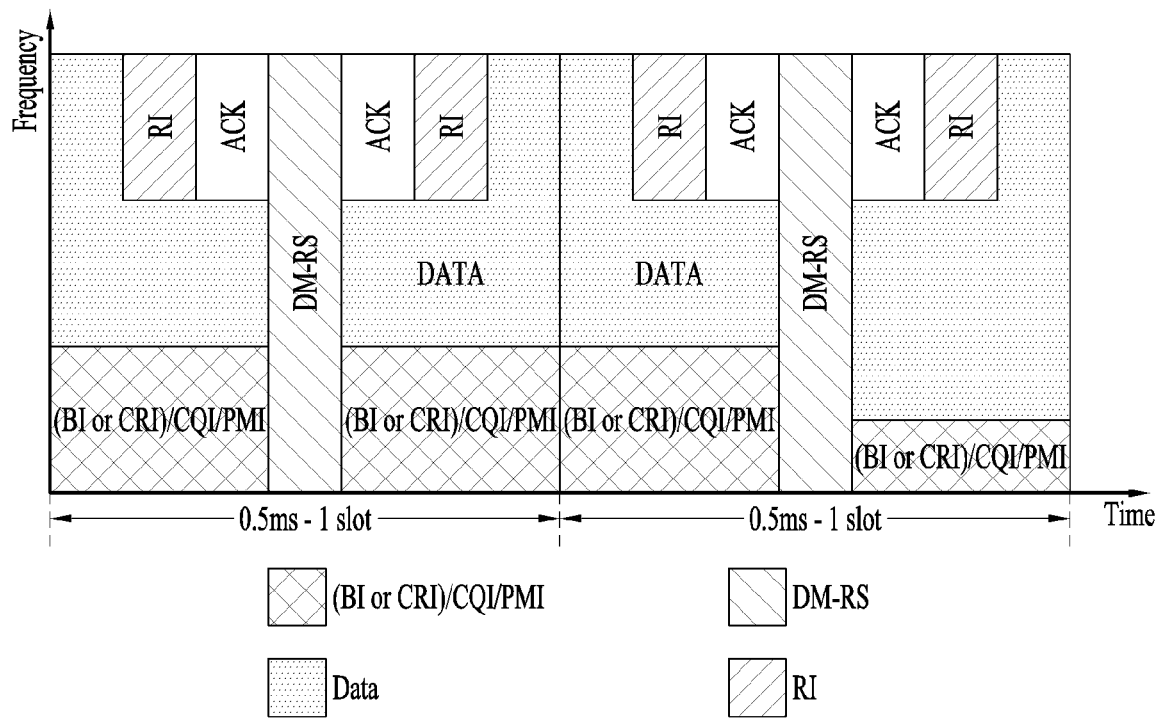

FIG. 16 illustrates an example that [BI or CRI]/PMI/CQI is transmitted through a resource element position to which the legacy PMI/CQI is transmitted, in accordance with the second suggested method. In the second suggested method, [BI or CRI] may be transmitted by being channel-encoded together with PMI/CQI in the second suggested method.

Figure 17:
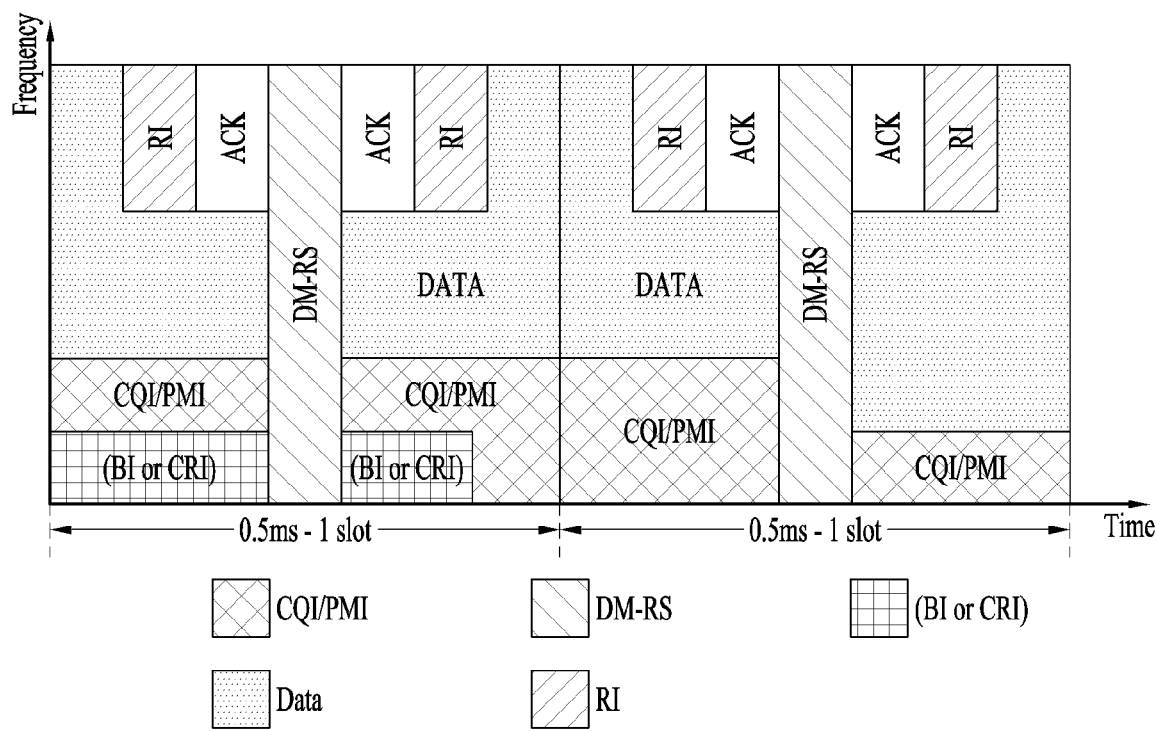

In the third suggested method, a method for channel-encoding [BI or CRI] independently from PMI/CQI and mapping the [BI or CRI] into a virtual resource element will be suggested as shown in FIG. 17. If a transmission symbol which belongs to one OFDM symbol is transmitted in SC-OFDM (Single Carrier-Orthogonal Frequency Division Multiplexing) mode, a frequency axis of FIG. 17 is defined as a virtual frequency axis. In the third suggested method, since only [BI or CRI] is transmitted independently by channel-encoding, the receiver of the base station may first determine [BI or CRI], determine sizes of PMI and CQI based on the received RI, and perform decoding in accordance with the determined result to receive PMI/CQI. In this case, channel coding applied to [BI or CRI] may be different from channel coding applied to PMI/CQI. For example, block coding may be applied to channel coding applied to [BI or CRI], and convolution channel coding may be applied to PMI/CQI. Also, CRC addition may be designated individually during channel coding. Representatively, CRC is not added during channel coding of [BI or CRI] but CRC may be added during channel coding of PMI/CQI. Also, modulation of [BI or CRI] may be restricted to QPSK modulation regardless of modulation of data. In this case, if the number of CSI-RS resources configured for the CSI process, that is, the number of antenna port groups is 1, a length of [BI or CRI] becomes 0, whereby [BI or CRI] may not be transmitted.

If it is intended to transmit CSI through PUSCH in accordance with the first to third suggested methods, it should be determined how many resource elements (REs) among resources which are allocated should be used to transmit CSI.

In case of the first suggested method, information on concatenation of BI and CRI or the number of resource elements (REs) to which BRI is transmitted may be determined as expressed in Equation 18. Hereinafter, [BI or CRI]+RI collectively refer to information (BRI) newly defined by combination of [BI or CRI] and RI as well as concatenation type of [BI or CRI] and RI.

$$Q'_{(BI\ or\ CRI) \to RI} = \min\left(\left\lceil \frac{O \times M_{sc}^{PUSCH\text{-}initial} \times N_{symb}^{PUSCH\text{-}initial} \times \beta_{offset}^{(BI\ or\ CRI)+RI}}{\sum_{r=0}^{C-1} K_r} \right\rceil, 4 \times M_{sc}^{PUSCH}\right)$$ [Equation 18]

In this case, O indicates the number of [BI or CRI]+RI bits which will be transmitted, and $M_{sc}^{PUSCH}$ indicates the number of subcarriers allocated for PUSCH transmission. $M_{sc}^{PUSCH\text{-}initli}$ indicates the number of subcarriers allocated at a subframe of initial PUSCH transmission timing. $N_{symb}^{PUSCH\text{-}initial}$ indicates the number of SC-FDMA symbols used for PUSCH transmission at a subframe of initial PUSCH transmission timing. C and $K_r$ indicate the number of coding blocks of data which will be transmitted through PUSCH and a length of data bits per code block. In this case, $\beta_{offset}^{(BI\ or\ CRI)+RI}$ is a corrected value and may be configured to be notified from the base station to the UE through RRC signaling. As another embodiment, $\beta_{offset}^{RI}$ transmitted for transmission of RI may be used as $\beta_{offset}^{(BI\ or\ CRI)+RI}$. In other words, $\beta_{offset}^{(BI\ or\ CRI)+RI}$ which is a corrected value applied to calculate the number of resource elements (REs) for transmitting [BI or CRI]+RI may be the same value as $\beta_{offset}^{RI}$ which is a corrected value applied to calculate the number of resource elements for transmitting specific RI without specific CRI. At this time, the number of resource elements for transmitting specific RI without the specific CRI may be calculated through the following Equation 20.

Subsequently, the number of REs to which PMI/CQI is transmitted in the first suggested method may be determined as follows.

$$Q'_{CQI} = \min\left(\left\lceil \frac{(O+L) \times M_{sc}^{PUSCH\text{-}initial} \times N_{symb}^{PUSCH\text{-}initial} \times \beta_{offset}^{CQI}}{\sum_{r=0}^{C-1} K_r} \right\rceil, M_{sc}^{PUSCH} \times N_{symb}^{PUSCH} - Q'_{(BI\ or\ CRI)+RI}\right)$$ [Equation 19]

In this case, O indicates the number of PMI/CQI bits which will be transmitted, and L indicates a length of added CRC bits.

In the second suggested method, the number of REs to which RI is transmitted may be determined as follows.

$$Q'_{RI} = \min\left(\left\lceil \frac{O \times M_{sc}^{PUSCH\text{-}initial} \times N_{symb}^{PUSCH\text{-}initial} \times \beta_{offset}^{CQI}}{\sum_{r=0}^{C-1} K_r} \right\rceil, M_{sc}^{PUSCH} \times N_{symb}^{PUSCH} - Q'_{(BI\ or\ CRI)+RI}\right)$$ [Equation 20]

In this case, O indicates the number of RI bits which will be transmitted. In the second suggested method, the number of REs to which [BI or CRI]/PMI/CQI is transmitted may be determined as follows.

$$Q'_{CQI} = \min\left(\left\lceil \frac{(O+L) \times M_{sc}^{PUSCH\text{-}initial} \times N_{symb}^{PUSCH\text{-}initial} \times \beta_{offset}^{CQI}}{\sum_{r=0}^{C-1} K_r} \right\rceil, M_{sc}^{PUSCH} \times N_{symb}^{PUSCH} - Q'_{RI}\right)$$ [Equation 21]

In this case, O indicates the number of [BI or CRI]/PMI/CQI bits which will be transmitted, and L indicates a length of added CRC bits.

In the third suggested method, the number of REs to which RI is transmitted may be determined as follows.

$$Q'_{RI} = \min\left(\left\lceil \frac{O \times M_{sc}^{PUSCH\text{-}initial} \times N_{symb}^{PUSCH\text{-}initial} \times \beta_{offset}^{RI}}{\sum_{r=0}^{C-1} K_r} \right\rceil, 4 \times M_{sc}^{PUSCH}\right)$$ [Equation 22]

In this case, O indicates the number of RI bits which will be transmitted. The number of REs to which [BI or CRI] is transmitted may be determined as follows.

$$Q'_{(BI\ or\ CRI)} = \min\left(\left\lceil \frac{(O+L) \times M_{sc}^{PUSCH\text{-}initial} \times N_{symb}^{PUSCH\text{-}initial} \times \beta_{offset}^{(BI\ or\ CRI)}}{\sum_{r=0}^{C-1} K_r} \right\rceil, M_{sc}^{PUSCH} \times N_{symb}^{PUSCH} - Q'_{RI}\right)$$ [Equation 23]

In this case, O indicates the number of [BI or CRI] bits which will be transmitted, and L indicates a length of added CRC bits. The number of REs to which PMI/CQI is transmitted may be determined as follows.

$$Q'_{CQI} = \min\left(\left\lceil \frac{(O+L) \times M_{sc}^{PUSCH\text{-}initial} \times N_{symb}^{PUSCH\text{-}initial} \times \beta_{offset}^{CQI}}{\sum_{r=0}^{C-1} K_r} \right\rceil, M_{sc}^{PUSCH} \times N_{symb}^{PUSCH} - Q'_{RI} - Q'_{(RI\ or\ CRI)}\right)$$ [Equation 24]

In this case, O indicates the number of PMI/CQI bits which will be transmitted, and L indicates a length of added CRC bits.

In case of the third suggested method, the base station may individually notify the UE of $\beta_{offset}^{RI}$ or $\beta_{offset}^{BI\ or\ CRI}$ and $\beta_{offset}^{CQI}$ through RRC signaling. At this time, $\beta_{offset}^{RI}$ or $\beta_{offset}^{BI\ or\ CRI}$ and $\beta_{offset}^{CQI}$ and may be configured previously.

Alternatively, the corrected value $\beta_{offset}^{RI}$, $\beta_{offset}^{BI\ or\ CRI}$ or $\beta_{offset}^{CQI}$ may be configured differently per CSI process. That is, the corrected value may be varied depending on triggering to report CSI for a corresponding CSI process. For example, if CSI for a plurality of CSI processes should be reported by aperiodic CSI triggering DCI, a maximum value of corrected values of the CSI processes which should be reported may be selected and used.

Figure 18:
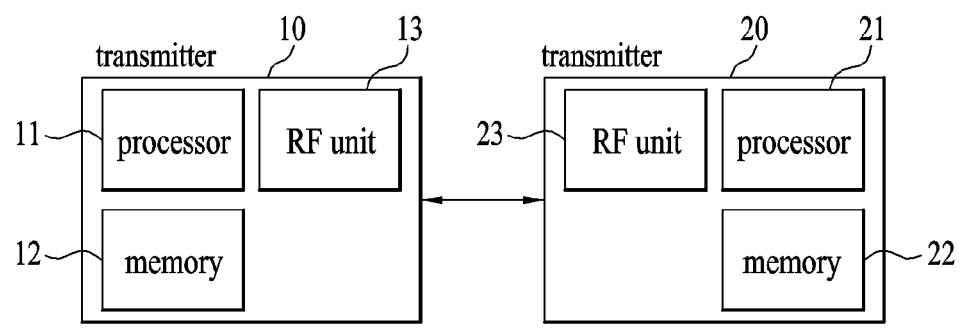
FIG. 18 is a block diagram illustrating an apparatus for implementing embodiment(s) of the present invention.

FIG. 18 is a block diagram illustrating a transmitter 10 and a receiver 20 configured to implement embodiments of the present invention. Each of the transmitter 10 and receiver 20 includes a radio frequency (RF) unit 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the RF unit 13, 23 and the memory 12, 22 to control the memory 12, 22 and/or the RF unit 13, 23 to allow the device to implement at least one of the embodiments of the present invention described above.

The memory 12, 22 may store a program for processing and controlling the processor 11, 21, and temporarily store input/output information. The memory 12, 22 may also be utilized as a buffer. The processor 11, 21 controls overall operations of various modules in the transmitter or the receiver. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using firmware or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

The processor 11 of the transmitter 10 performs predetermined coding and modulation of a signal and/or data scheduled by the processor 11 or a scheduler connected to the processor 11, and then transmits a signal and/or data to the RF unit 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiver in the form of one or more layers. To perform frequency-up transformation, the RF unit 13 may include an oscillator. The RF unit 13 may include Nt transmit antennas (wherein Nt is a positive integer greater than 1).

The signal processing procedure in the receiver 20 is configured as a reverse procedure of the signal processing procedure in the transmitter 10. The RF unit 23 of the receiver 20 receives a radio signal transmitted from the transmitter 10 under control of the processor 21. The RF unit 23 may include Nr receive antennas, and retrieves baseband signals by frequency down-converting the signals received through the receive antennas. The RF unit 23 may include an oscillator to perform frequency down-converting. The processor 21 may perform decoding and demodulation on the radio signal received through the receive antennas, thereby retrieving data that the transmitter 10 has originally intended to transmit.

The RF unit 13, 23 includes one or more antennas. According to an embodiment of the present invention, the antennas function to transmit signals processed by the RF unit 13, 23 are to receive radio signals and deliver the same to the RF unit 13, 23. The antennas are also called antenna ports. Each antenna may correspond to one physical antenna or be configured by a combination of two or more physical antenna elements. A signal transmitted through each antenna cannot be decomposed by the receiver 20 anymore. A reference signal (RS) transmitted in accordance with a corresponding antenna defines an antenna from the perspective of the receiver 20, enables the receiver 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. An RF unit supporting the Multiple-Input Multiple-Output (MIMO) for transmitting and receiving data using a plurality of antennas may be connected to two or more antennas.

In embodiments of the present invention, the UE operates as the transmitter 10 on uplink, and operates as the receiver 20 on downlink In embodiments of the present invention, the eNB operates as the receiver 20 on uplink, and operates as the transmitter 10 on downlink.

The transmitter and/or receiver may be implemented by one or more embodiments of the present invention among the embodiments described above. For example, the transmitter may correspond to the UE, and the receiver may correspond to the base station.

At this time, if a plurality of CSI-RS(channel state information-reference signal) resources are configured for a CSI(channel state information) process, the processor of the transmitter may generate channel state information including a CRI(CSI-RS resource indicator) indicating one of the plurality of CSI-RS resources and an RI (Rank Indicator) based on the CRI, and may report the channel state information by controlling the RF unit of the transmitter. At this time, the CRI and the RI may be concatenated and then included in the channel state information. For example, the CRI may be arranged prior to the RI and then concatenated with the RI.

Also, the processor of the receiver may receive the channel state information including the CRI and RI based on the CRI by controlling the RF unit of the receiver. At this time, the CRI and the RI may be included in the channel state information by being concatenated. For example, the CRI may be arranged prior to the RI and then concatenated.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention defined in the appended claims. Thus, the present invention is not intended to be limited to the embodiments described herein, but is intended to have the widest scope consistent with the principles and novel features disclosed herein.

INDUSTRIAL APPLICABILITY

The present invention is applicable to wireless communication devices such as a UE, a relay, and a BS.

The invention claimed is:

1. A method of reporting a channel state by a user equipment (UE) in a wireless communication system, the method comprising:

generating channel state information (CSI) based on at least one CSI-Reference Signal (CSI-RS) resource configured for the UE, wherein the CSI comprises a Rank Indicator (RI) and a CSI-RS resource indicator (CRI) with a bit size determined based on a number of the at least one CSI-RS resource, and the CRI is concatenated with the RI in the CSI, wherein, when a plurality of CSI-RS resources are configured for the UE, the bit size of the CRI is determined based on a plurality of CSI-RS resources, and the RI is related to the CRI, and wherein, when a single CSI-RS resource is configured for the UE, the bit size of the CRI is equal to 0 and the RI is related to the single CRI-RS; and reporting the CSI through a Physical Uplink Shared Channel (PUSCH), wherein, a number of resource elements for reporting the CSI satisfies the following Equation:

$$Q' = \min\left(\left\lceil \frac{O \times M_{sc}^{PUSCH\text{-}initial} \times N_{symb}^{PUSCH\text{-}initial} \times \beta_{offset}}{\sum_{r=0}^{C-1} K_r} \right\rceil, 4 \times M_{sc}^{PUSCH}\right)$$

where O indicates a total number of bits including the CSI, $M_{sc}^{PUSCH}$ indicates a number of subcarriers allocated for PUSCH transmission timing, $M_{sc}^{PUSCH\text{-}initial}$ indicates a number of subcarriers allocated at a subframe of an initial PUSCH transmission timing, $M_{symb}^{PUSCH\text{-}initial}$ indicates a number of single carrier frequency division multiple access (SC-FDMA) symbols used for PUSCH transmission at the subframe of the initial PUSCH transmission timing, C and $K_r$ indicate a number of coding blocks of data which will be transmitted through the PUSCH and a length of data bits per code blocks, and $\beta_{offset}$ indicates an offset value.

2. The method of claim 1, wherein the CRI and the RI are concatenated by arranging the CRI prior to the RI.

3. The method of claim 1, wherein, when the single CSI-RS resource is configured for the UE, the CRI is not reported.

4. A method of receiving channel state information (CSI) by a base station in a wireless communication system, the method comprising:

configuring at least one channel state information reference signal (CSI-RS) resource for a user equipment (UE); and receiving the CSI through a Physical Uplink Shared Channel (PUSCH) based on the at least one CSI-RS resource, wherein, the CSI comprises a Rank Indicator (RI) and a CSI-RS resource indicator (CRI) with a bit size determined based on a number of the at least one CSI-RS resource, and the CRI is concatenated with the RI in the CSI, wherein, when a plurality of CSI-RS resources are configured for the UE, the bit size of the CRI is determined based on a plurality of CSI-RS resources, and the RI is related to the CRI, and wherein, when a single CSI-RS resource is configured for the UE, the bit size of the CRI is equal to 0 and the RI is related to the single CRI-RS, wherein, a number of resource elements for reporting the CSI satisfies the following Equation:

$$Q' = \min\left(\left\lceil \frac{O \times M_{sc}^{PUSCH-initial} \times N_{symb}^{PUSCH-initial} \times \beta_{offset}}{\sum_{r=0}^{C-1} K_r} \right\rceil, 4 \times M_{sc}^{PUSCH}\right)$$

where O indicates a total number of bits including the CSI, $M_{sc}^{PUSCH}$ indicates a number of subcarriers allocated for PUSCH transmission timing, $M_{sc}^{PUSCH-initial}$ indicates a number of subcarriers allocated at a subframe of an initial PUSCH transmission timing, $M_{symb}^{PUSCH-initial}$ indicates a number of single carrier-frequency division multiple access (SC-FDMA) symbols used for PUSCH transmission at the subframe of the initial PUSCH transmission timing, C and $K_r$ indicate a number of coding blocks of data which will be transmitted through the PUSCH and a length of data bits per code blocks, and $\beta_{offset}$ indicates an offset value.

5. The method of claim 4, wherein, the CRI and the RI are concatenated by arranging the CRI prior to the RI.

6. The method of claim 4, wherein, when the single CSI-RS resource is configured for the UE, the CRI is not reported.

7. A user equipment (UE) in a wireless communication system, the UE comprising:

a transmitter and receiver; and a processor configured to control the transmitter and receiver, wherein the processor is further configured to:

generate channel state information (CSI) based on at least one channel state information-reference signal (CSI-RS) resource configured for the UE, wherein the CSI comprises a Rank Indicator (RI) and a CSI-RS resource indicator (CRI) with a bit size determined based on a number of the at least one CSI-RS resource, and the CRI is concatenated with the RI in the CSI, wherein, when a plurality of CSI-RS resources are configured for the UE, the bit size of the CRI is determined based on a plurality of CSI-RS resources, and the RI is related to the CRI, and wherein, when a single CSI-RS resource is configured for the UE, the bit size of the CRI is equal to 0 and the RI is related to the single CRI-RSI; and report the CSI on a Physical Uplink Shared Channel (PUSCH), wherein, a number of resource elements for reporting the CSI satisfies the following Equation:

$$Q' = \min\left(\left\lceil \frac{O \times M_{sc}^{PUSCH-initial} \times N_{symb}^{PUSCH-initial} \times \beta_{offset}}{\sum_{r=0}^{C-1} K_r} \right\rceil, 4 \times M_{sc}^{PUSCH}\right)$$

where O indicates a total number of bits including the CSI, $M_{sc}^{PUSCH}$ indicates a number of subcarriers allocated for PUSCH transmission timing, $M_{sc}^{PUSCH-initial}$ indicates a number of subcarriers allocated at a subframe of an initial PUSCH transmission timing, $M_{symb}^{PUSCH-initial}$ indicates a number of single carrier-frequency division multiple access (SC-FDMA) symbols used for PUSCH transmission at the subframe of the initial PUSCH transmission timing, C and $K_r$ indicate a number of coding blocks of data which will be transmitted through the PUSCH and a length of data bits per code blocks, and $\beta_{offset}$ indicates an offset value.

8. The UE of claim 7, wherein, the CRI and the RI are concatenated by arranging the CRI prior to the RI.

9. The UE of claim 7, wherein, when the single CSI-RS resource is configured for the UE, the CRI is not reported.

10. A base station in a wireless communication system, the base station comprising:

a transmitter and receiver; and a processor configured to control the transmitter and receiver, wherein the processor is further configured to:

configure at least one channel state information-reference signal (CSI-RS) resource for a user equipment (UE); and control the receiver to receive the CSI through a Physical Uplink Shared Channel (PUSCH) based on the at least one CSI-RS resource, wherein, the CSI comprises a Rank Indicator (RI) and a CSI-RS resource indicator (CRI) with a bit size determined based on a number of the at least one CSI-RS resource, and the CRI is concatenated with the RI in the CSI, wherein, when a plurality of CSI-RS resources are configured for the UE, the bit size of the CRI is determined based on a plurality of CSI-RS resources, and the RI is related to the CRI, and wherein, when a single CSI-RS resource is configured for the UE, the bit size of the CRI is equal to 0 and the RI is related to the single CRI-RS, wherein, a number of resource elements for reporting the CSI satisfies the following Equation:

$$Q' = \min\left(\left\lceil \frac{O \times M_{sc}^{PUSCH-initial} \times N_{symb}^{PUSCH-initial} \times \beta_{offset}}{\sum_{r=0}^{C-1} K_r} \right\rceil, 4 \times M_{sc}^{PUSCH}\right)$$

where O indicates a total number of bits including the CSI, $M_{sc}^{PUSCH}$ indicates a number of subcarriers allocated for PUSCH transmission timing, $M_{sc}^{PUSCH-initial}$ indicates a number of subcarriers allocated at a subframe of an initial PUSCH transmission timing, $M_{symb}^{PUSCH-initial}$ indicates a number of single carrier-frequency division multiple access (SC-FDMA) symbols used for PUSCH transmission at the subframe of the initial PUSCH transmission timing, C and $K_r$ indicate a number of coding blocks of data which will be transmitted through the PUSCH and a length of data bits per code blocks, and $\beta_{offset}$ indicates an offset value.

11. The base station of claim 10, wherein, the CRI and the RI are concatenated by arranging the CRI prior to the RI.

12. The base station of claim 10, wherein, when the single CSI-RS resource is configured for the UE, the CRI is not reported.

* * * * *